(12) United States Patent
Van Dillen et al.

(10) Patent No.: US 9,635,972 B2
(45) Date of Patent: May 2, 2017

(54) APPARATUS, METHOD AND KIT FOR RETROFITTING AN INDOOR WATER DISPENSER OF AN EXISTING REFRIGERATOR

(75) Inventors: Tiemen T. Van Dillen, Varese (IT); Lukasz D. Skalski, Sterling Heights, MI (US); Luca Gamberoni, Ispra (IT); Steven J. Kuehl, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 13/591,260

(22) Filed: Aug. 22, 2012

(65) Prior Publication Data

US 2012/0312729 A1 Dec. 13, 2012

Related U.S. Application Data

(63) Continuation of application No. 12/058,798, filed on Mar. 31, 2008, now Pat. No. 8,359,969.

(51) Int. Cl.
*A47J 31/06* (2006.01)
*A47J 31/42* (2006.01)
*D04B 3/00* (2006.01)
*A47J 31/40* (2006.01)
*A47J 31/44* (2006.01)

(52) U.S. Cl.
CPC ............ *A47J 31/407* (2013.01); *A47J 31/44* (2013.01); *Y10T 137/0402* (2015.04)

(58) Field of Classification Search
CPC ..... A47J 31/005; A47J 31/4403; A47J 31/007
USPC ..... 99/279, 284, 289 R, 291, 295, 300, 304; 62/338, 340; 222/146.6
See application file for complete search history.

(56) References Cited

U.S. PATENT DOCUMENTS

| 2004/0118290 | A1* | 6/2004 | Cai ..................... A47J 31/4478 99/275 |
| 2006/0144242 | A1* | 7/2006 | Mitchell ............... A47J 31/407 99/275 |
| 2007/0012719 | A1* | 1/2007 | Holler .................. B67D 1/0078 222/61 |

* cited by examiner

*Primary Examiner* — Tu B Hoang
*Assistant Examiner* — Thomas Ward

(57) ABSTRACT

Apparatuses, methods and systems for retrofitting an indoor water dispenser of an existing refrigerator having a water outlet with one or more components to provide secondary water conditioning to dispense an enhanced beverage using water from the water outlet of the indoor water dispenser are provided.

4 Claims, 28 Drawing Sheets

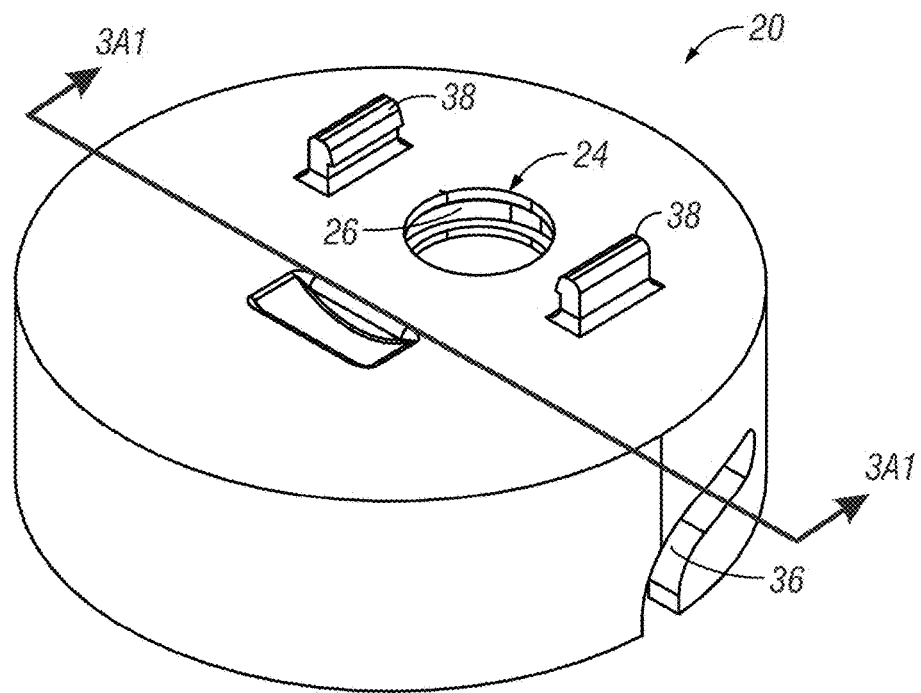
*FIG. 3A*
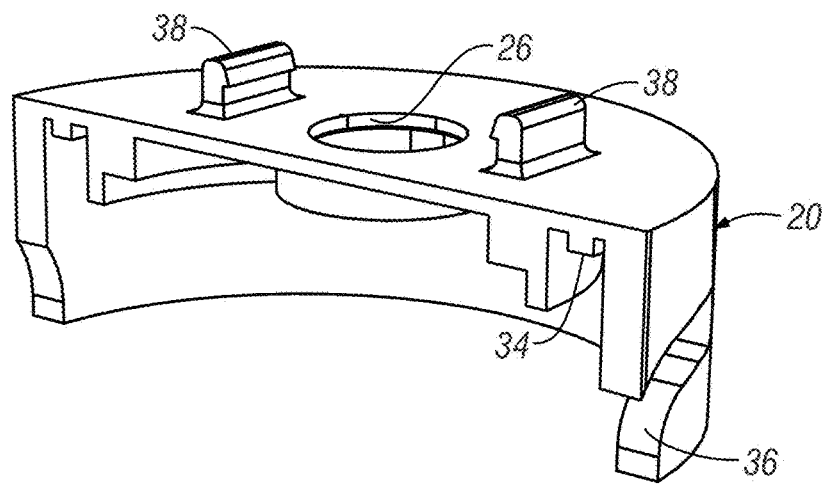
*FIG. 3A1*

APPARATUS, METHOD AND KIT FOR RETROFITTING AN INDOOR WATER DISPENSER OF AN EXISTING REFRIGERATOR

BACKGROUND OF THE INVENTION

The present invention relates to retrofitting an indoor water dispenser of an existing refrigerator, and more particularly, to an apparatus, method and kit for retrofitting an indoor water dispenser of an existing refrigerator to provide secondary water conditioning to dispense an enhanced beverage using water from the water outlet of the indoor water dispenser.

BACKGROUND OF THE INVENTION

Dispensing water from an indoor dispenser of a refrigerator is well known. In fact, many existing refrigerators whether in a home, business or on the showroom floor have an indoor water dispenser having a water outlet to dispense water. Although these existing refrigerators can dispense water, no concept or platform exists to convert, reconfigure or retrofit an indoor water dispenser of an existing refrigerator to provide conditioning of the water with additives to dispense an enhanced beverage. To this point, some work has been directed to configuring a refrigerator during manufacturing with the necessary hardware, architecture and componentry to dispense flavoring. Although these systems can dispense a flavored beverage, they are only feasible and operable to the extent the necessary hardware, architecture and componentry are installed during manufacturing.

Therefore, a need has been identified in the art to provide an apparatus, method and kit for retrofitting an indoor water dispenser of an existing refrigerator with an adapter capable of securing an additive capsule thereto for combining additives with the water to dispense an enhanced beverage.

Indoor water dispensers in an existing refrigerator are specific to brand, type platform, and model and as a result are dimensioned, constructed and configured differently.

Therefore, a need has been identified in the art to provide an apparatus, method and kit for retrofitting an indoor water dispenser of an existing refrigerator, regardless of brand, type, platform, or model, with a brand, type, platform, or model specific adapter having a universal attachment interface capable of securing a universal additive capsule thereto for combining additives with water from the water outlet to dispense an enhanced beverage.

BRIEF SUMMARY OF THE INVENTION

Apparatuses, methods and kits for retrofitting an indoor water dispenser of an existing refrigerator having a water outlet with one or more components for providing secondary conditioning of the water from the water outlet to create an enhanced beverage are provided.

According to one aspect of the present invention, an apparatus for retrofitting an indoor water dispenser of a refrigerator having a water outlet and preexisting connection points is disclosed. The apparatus includes an adapter having one or more geometries to permanently or removably secure to the indoor water dispenser of the refrigerator and allow for secondary conditioning of the water stream. In a preferred form, the preexisting connection points may be a seam between surfaces, components, or parts of the indoor water dispenser, a component of the indoor water dispenser, or a component, surface or part of the refrigerator, the indoor water dispenser, or the water outlet. The apparatus also may include a water outlet interface with a seal to seal about the water outlet, such as an O-ring, a grommet, a self-sealing eyelet, a washer, a packing material, or a flexible tube drawn tight about the water outlet with a draw string, zip tie or other cinching member. The one or more geometries on the adapter may include a clip, a tab, a finger, a prong, a hook, a pressure coupling assembly adapted to expand to pressure fit the adapter within the indoor water dispenser, or any other like attachment mechanism. The adapter also includes a universal attachment interface for attaching one or more secondary conditioning components having an additive component to condition water from the water outlet to provide an enhanced beverage. In the preferred form, the additive capsule is adapted to attach and seal to the universal attachment interface so the adapter directs at least a portion of the water from the water outlet to the additive capsule to dispense the additive component. The adapter may also include a capsule holder having a connection interface adapted to secure to the adapter to attach and seal the additive capsule to the universal attachment interface.

According to another aspect of the present invention, a new method for retrofitting an indoor water dispenser of a refrigerator having a water outlet for secondary water conditioning is disclosed. The method includes providing an adapter configured to attach to the indoor water dispenser and seal about the water outlet, attaching the adapter to the indoor water dispenser, and sealing the adapter about the water outlet. In a preferred form, the method includes the adapter with a universal attachment interface to connect a secondary conditioning system thereto, conditioning water from the water outlet of the indoor water dispenser by adding an additive, flavor or aroma with the secondary conditioning system, attaching the adapter to one or more preexisting connection points associated with the indoor water dispenser by clipping into one or more of the preexisting connection points, hooking onto one or more of the preexisting connection points, clamping onto one or more of the preexisting connection points, snapping onto or into one or more of the preexisting connection points, or adhering to one or more of the preexisting connection points. The method also includes attaching an additive capsule to the universal attachment interface, directing at least a portion of the water from the water outlet to the additive capsule to dispense the additives, attaching a additive capsule to the universal attachment interface with a capsule holder, and inserting the water outlet into a water outlet interface in the adapter to seal the adapter to the water outlet to maintain the pressure of the water from water outlet within the retrofit.

According to yet another aspect of the present invention, a kit for retrofitting an existing indoor water dispenser of a refrigerator having a water outlet for beverage dispensing is disclosed. The kit may include an adapter to secure to the indoor water dispenser, a set of instructions to install the adapter, and one or more tools to install the adapter. In a preferred form, the adapter in the kit has one or more geometries to permanently or removably secure the adapter to the indoor water dispenser to attach one or more additional components to the adapter. The kit may further include one or more additive capsules for attaching to the adapter to make an enhanced beverage with water from the water outlet and a capsule holder for securing the additive capsule to the adapter. The kit may further include one or more specific connection parts and one or more adapters to cover all possible brands and models, where the consumer will be able to select the right connection part & adapter for their model and where the adapter, additive capsule, and capsule holder each have a universal attachment interface adapted to function across all models, types and brands of the refrigerator.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 3A is a perspective view of the adapter shown in FIG. 2;

FIG. 3A1 is a cross sectional view of the adapter taken along line 3A1-3A1 in FIG. 3A;

DETAILED DESCRIPTION OF THE PREFERRED EMBODIMENTS

Figure 1A:
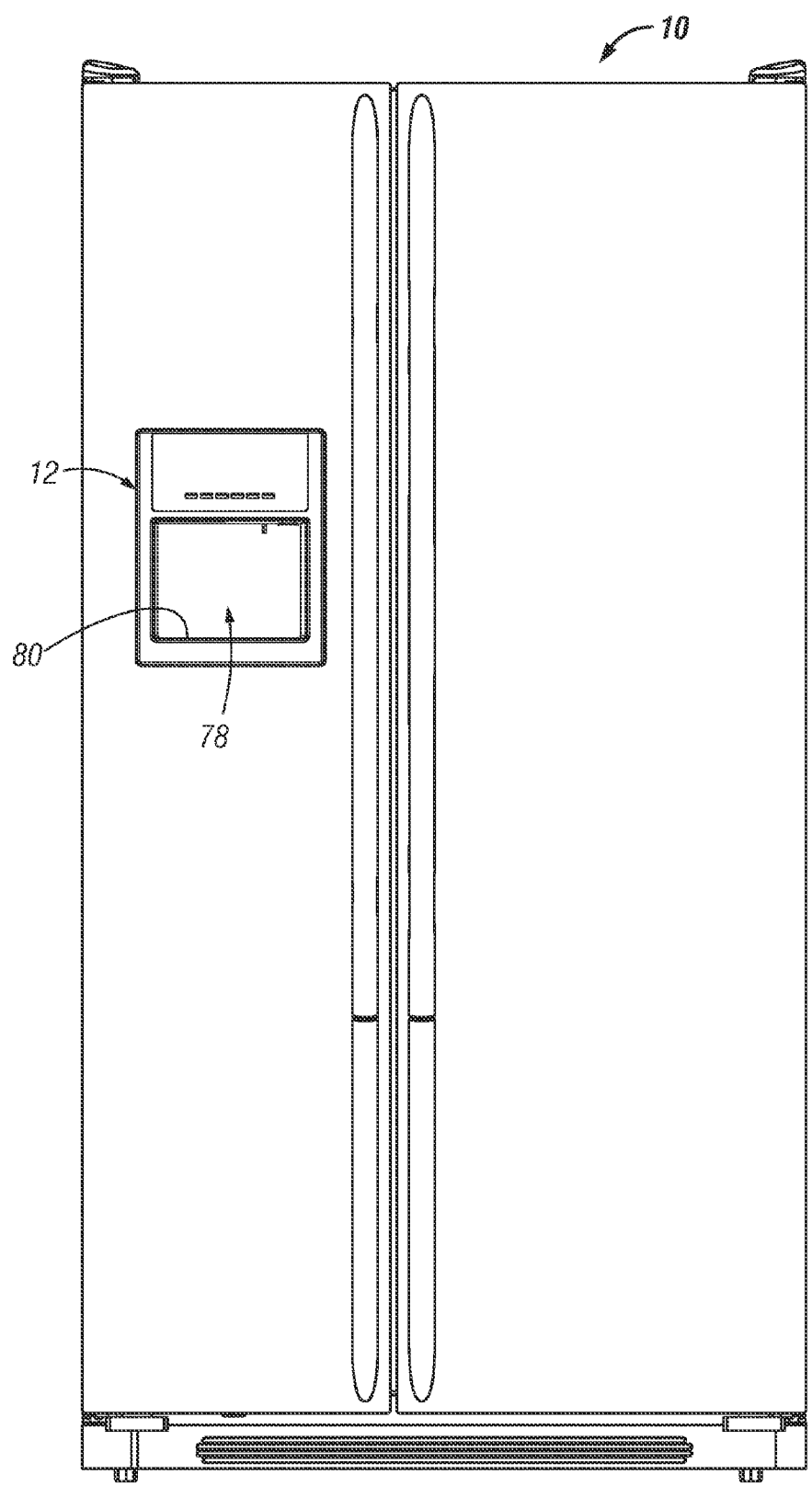
FIG. 1A is a front elevation view of a refrigerator and indoor water dispenser of the prior art.

The preferred embodiment of this present invention has been set forth in the drawings and specification and although specific terms are employed, these are used in the generically descriptive sense only and are not used for the purposes of limitation. Changes in the formed proportion of parts as well in the substitution of equivalence are contemplated as circumstances may suggest or are rendered expedient without departing from the spirit and scope of the invention as further defined in the following description and claims.

The apparatuses, methods and kits of the present invention are directed to a retrofit for an indoor water dispenser of an existing refrigerator.

Apparatus

FIG. 1A illustrates a refrigerator 10 having an indoor water dispenser 12 as are commonly known in the prior art. Indoor water dispenser 12 provides a chilled and controlled stream of water at a door of the refrigerator taken from a plumbed or non-plumbed water line, depending upon make, model or type of refrigerator 10. Thus, as is commonly known, a user can discharge cold water from the dispensing area 78 of indoor dispenser 12 for drinking and other purposes.

Figure 1B:
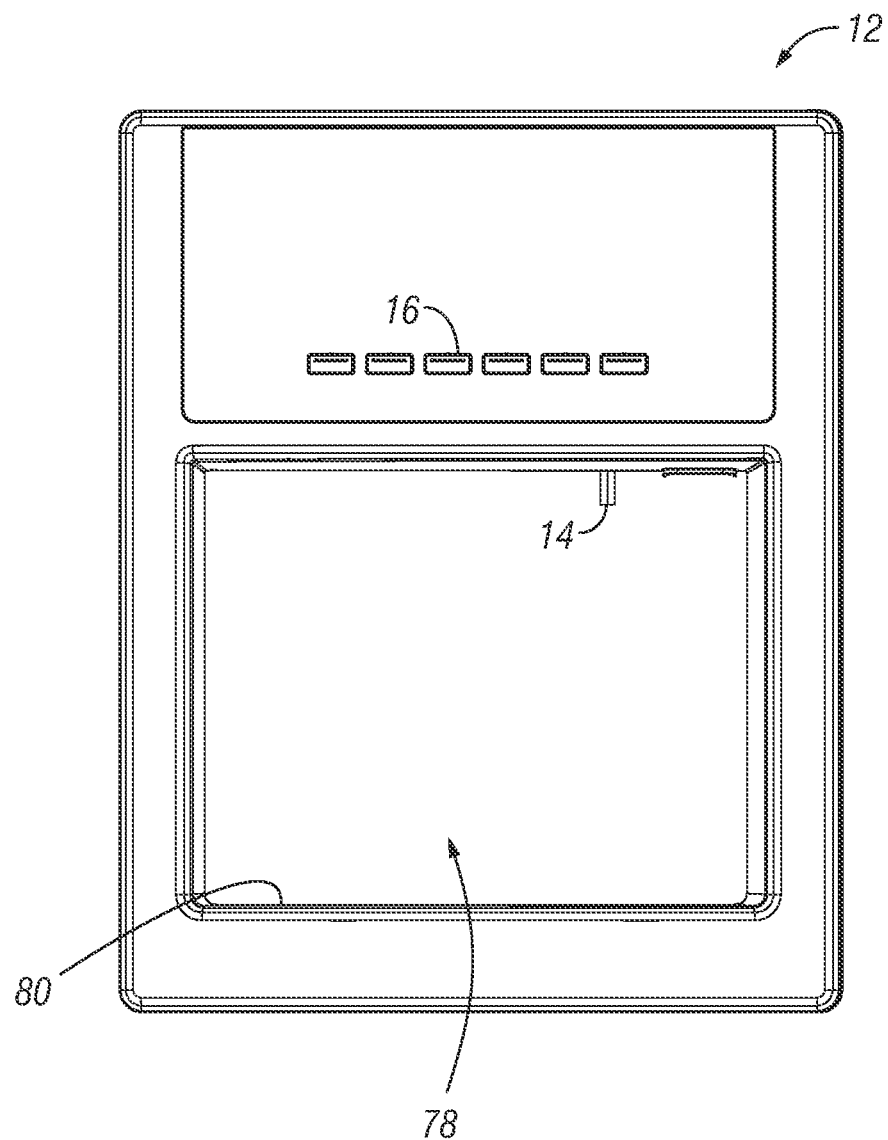
FIG. 1B is a front elevation view of the indoor water dispenser of the prior art shown in FIG. 1A.

FIG. 1B is a front elevation view of the indoor water dispenser 12 shown in FIG. 1A of the prior art. Many, if not all, indoor water dispensers, such as the indoor water dispenser 12 shown in FIG. 1B, have a water outlet 14 within dispensing area 78 configured to dispense water. The water is typically dispensed as a controlled stream into some receptacle, such as a cup or other container. Commonly, water outlet 14 is constructed from tubing, hose, or like water carrying media. Many existing refrigerators, such as refrigerator 12 shown in FIG. 1A illustrating the prior art, are configured with such an indoor water dispenser similar or like the indoor water dispenser 12 illustrated in FIG. 1B. Variations of the indoor water dispenser depend upon the various makes, models, platforms, and types of refrigerators, but as a general rule perform identical functions, such as dispensing a charge of water upon actuation of a mechanical, mechanical-electrical or electrical switch.

Figure 2:
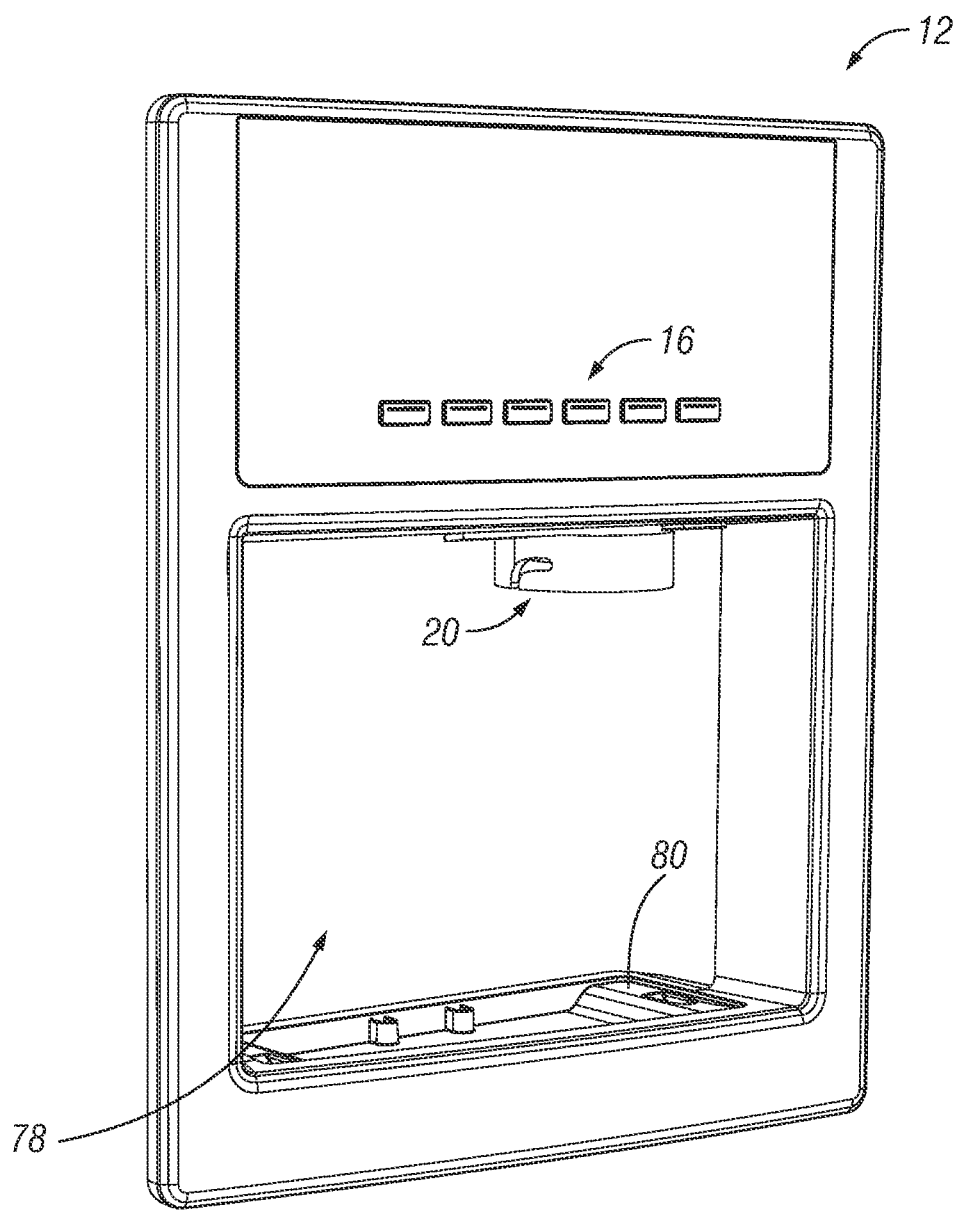
FIG. 2 is a perspective view of the indoor water dispenser of the prior art shown in FIG. 1B retrofitted with one exemplary embodiment of the present invention.

The popularity of the indoor water dispenser 12 is likely a result of how conveniently the user can access chilled water, often at the touch of a button or flip or depression of a switch. Although existing refrigerators, such as refrigerator 10 illustrated in FIG. 1A of the prior art, can dispense chilled water for drinking and other uses, they are not configured to combine additives with the water to dispense an enhanced beverage from the indoor water dispenser. Some refrigerators, such as the refrigerator shown in application Ser. No. 11/027,124 to Mitchell et al., are capable of dispensing an enhanced beverage but only if refrigerator 10 has the requisite stock components, architectures, conduits and other systems installed when first manufactured. As many refrigerators, similar to refrigerator 12 shown in FIG. 1A of the prior art, have an indoor water dispenser 12 but do not have the requisite stock components installed during manufacturing for dispensing enhanced beverages, the present invention provides apparatuses, methods and kits for retrofitting an indoor water dispenser of an existing refrigerator, regardless of brand, type, platform, or model, with a universal attachment interface capable of securing a universal additive capsule thereto for combining additives, such as flavoring, minerals, vitamins, whether insoluble, soluble or otherwise, with the water from the outlet of the indoor water dispenser to create an enhanced beverage for the user. One such apparatus is best illustrated in FIG. 2 where the indoor water dispenser 12 of the prior art is retrofitted with one adapter 20 type of the present invention that connects to the indoor water dispenser 12 and seals about the water outlet 14 for connecting other components thereto, such as additive capsule 40 alone or together with capsule holder 44. The apparatus shown in FIG. 2 allows the user to combine the water component provided by the indoor water dispenser 12 of the prior art with an additive component using the retrofit apparatus of the present invention; this is accomplished using an adapter such as adapter 20 that is configured to attach to an existing indoor water dispenser 12 to provide an interface for secondary conditioning of water from dispenser 12 with additives to create an enhanced beverage while maintaining the same conveniences associated with the preexisting indoor water dispenser 12.

Figure 3B:
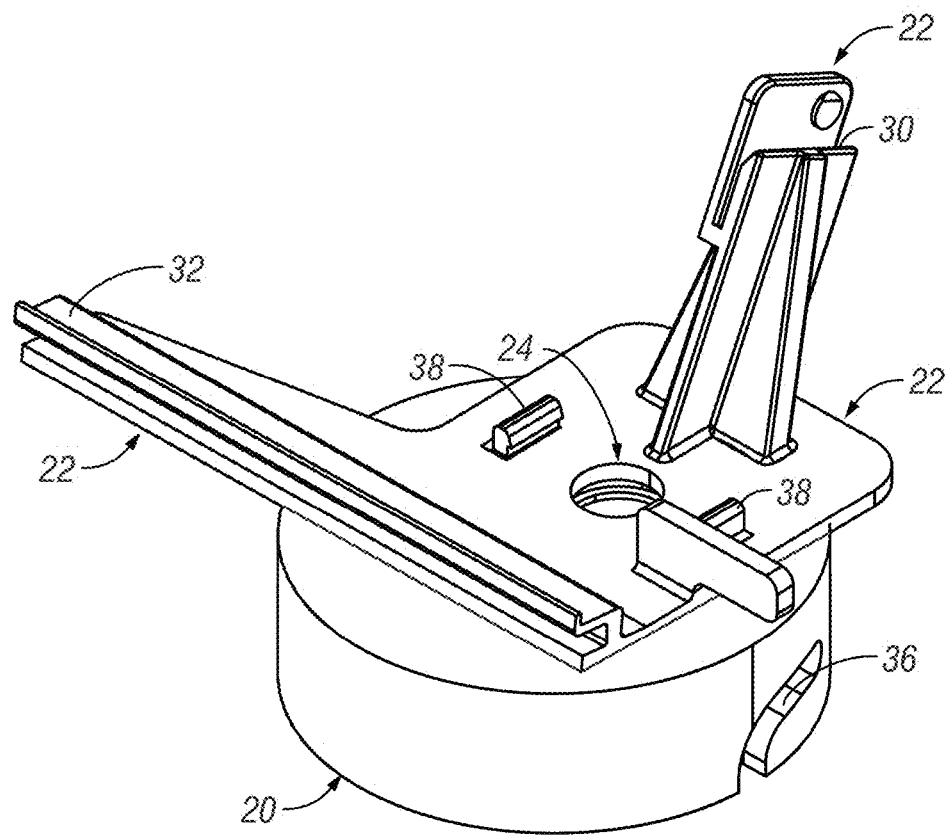
FIG. 3B is a perspective view of the adapter shown in FIG. 3A having connection geometry according to an exemplary aspect of the present invention.

FIG. 3A illustrates one exemplary embodiment of adapter 20. In the broadest sense, adapter 20 is a universal part that may be configured with various types of connection geometry 22, such as those illustrated in FIGS. 3B, 6A, 13A, and 13B. Adapter 20 and connection geometries 22 may also be formed together as a single piece to form a true universal retrofit piece that can connect to indoor water dispensers of various types of refrigerators regardless of brand, make, platform, or model. For the purpose of securing connection geometries 22 to indoor dispenser 12 it has been found that forming adapter 20 as a separate piece would allow the user to easily connect the appropriate connection geometry 22 to the indoor water dispenser 12 and then attach the adapter 20 to the connection geometry 22 already secured to the dispenser 12. The user may also prefer to install connection geometry 22 while separated from adapter 20 so the connection geometry 22 can be manipulated and contorted to secure to the dispenser 12. One skilled in the art can appreciate the need to have a universal adapter with connection geometry 22 specific to the various brand, make, platform, and model of refrigerator 10. For example, adapter 20 could be a universal part that could be configured with connection geometry 22 and water outlet interface 24 specific to each brand, make, platform, or model of refrigerator or other applicable appliances or water dispensing units, such as a tabletop or free standing, water bottle dispensers. For this reason, adapter 20 should not be construed as being limited to retrofitting refrigerators only but could be used to retrofit other appliances for enhanced beverage dispensing. For example, the apparatuses of the present invention could be used to retrofit a tabletop or freestanding water bottle dispenser. Therefore, adapter 20 need only have a means for rigidly securing adapter 22 to the appliance and sealing the adapter to or about the water outlet 14 or water dispensing member depending on the type of appliance adapter 20 is used to retrofit.

Adapter 20 has an aperture 26 extending through the body of adapter 20 to connect or seal about the water outlet 14. Aperture 26 may also function as water outlet interface 24 to seal about water outlet 14. One skilled in the art can appreciate that aperture 26 and/or water outlet interface 24 could be configured with an O-ring, grommet, self-sealing eyelet, washer, some packing material, or a flexible tube drawn tight about the water outlet with a draw string, zip tie or other like cinching member, or any like sealing media to seal water outlet interface 24 and/or aperture 26 to water outlet 14.

In the preferred form, adapter 20 also includes a means for connecting one or more other components thereto. For example, groove 36 could be formed in the side walls of adapter 20 for attaching other components to adapter 20. Adapter 20 should not be construed as being limited to a groove type attachment point. For example, various other type of connections could be used to attach other components to adapter 20 such as a threaded union, a quick-coupler, a compression fit connection, a slip joint, a gasket fitting, or any other suitable connection type adapted to permanently or temporally hold one or more other components to adapter 20. In the preferred form, adapter 20 also includes a universal attachment interface 34 (best shown in FIG. 3A1) that is adapted to seal the mating surfaces between the adapter 20 and components connected thereto, such as additive capsule 40 shown in FIG. 4.

An exemplary embodiment of connection geometry 22 for securing adapter 20 to indoor water dispenser 12 is shown in FIG. 3B. Adapter 20 and connection geometry 22 may be configured as a single unitary piece or as separate pieces. For example, adapter 20 and connection geometry 22 may take on any type of configuration so as to retrofit to an indoor water dispenser 12 regardless of the make, model, platform, or brand of refrigerator 10. Thus, connection geometry 22 could be a custom piece designed and fitted to an indoor water dispenser regardless of the make, model, platform, or brand of the refrigerator 10. The present invention contemplates that adapter 20 could be a universal part or component, such that connection geometries 22 would interface adapter 20 with the various types of existing indoor water dispensers.

In the broadest sense of the present invention, connection geometries 22 have one or more attachment points adapted to secure to or within pre-existing connection points 18 associated with the refrigerator 10, indoor water dispenser 12, and/or water outlet 14. For example, connection geometries 22 could include a clip, a tab, a finger, a prong, a hook, cinch-tie, or any other like attachment mechanism adapted to secure adapter 20 to indoor water dispenser 12.

In FIG. 3B, connection geometry 22 includes a clip point 30 and flange having a lip 32 for securing to the indoor water dispenser 12. Connection geometry 22 may differ to accommodate the various types of structure associated with each make, model, platform, or brand of indoor dispenser.

Figure 3C:
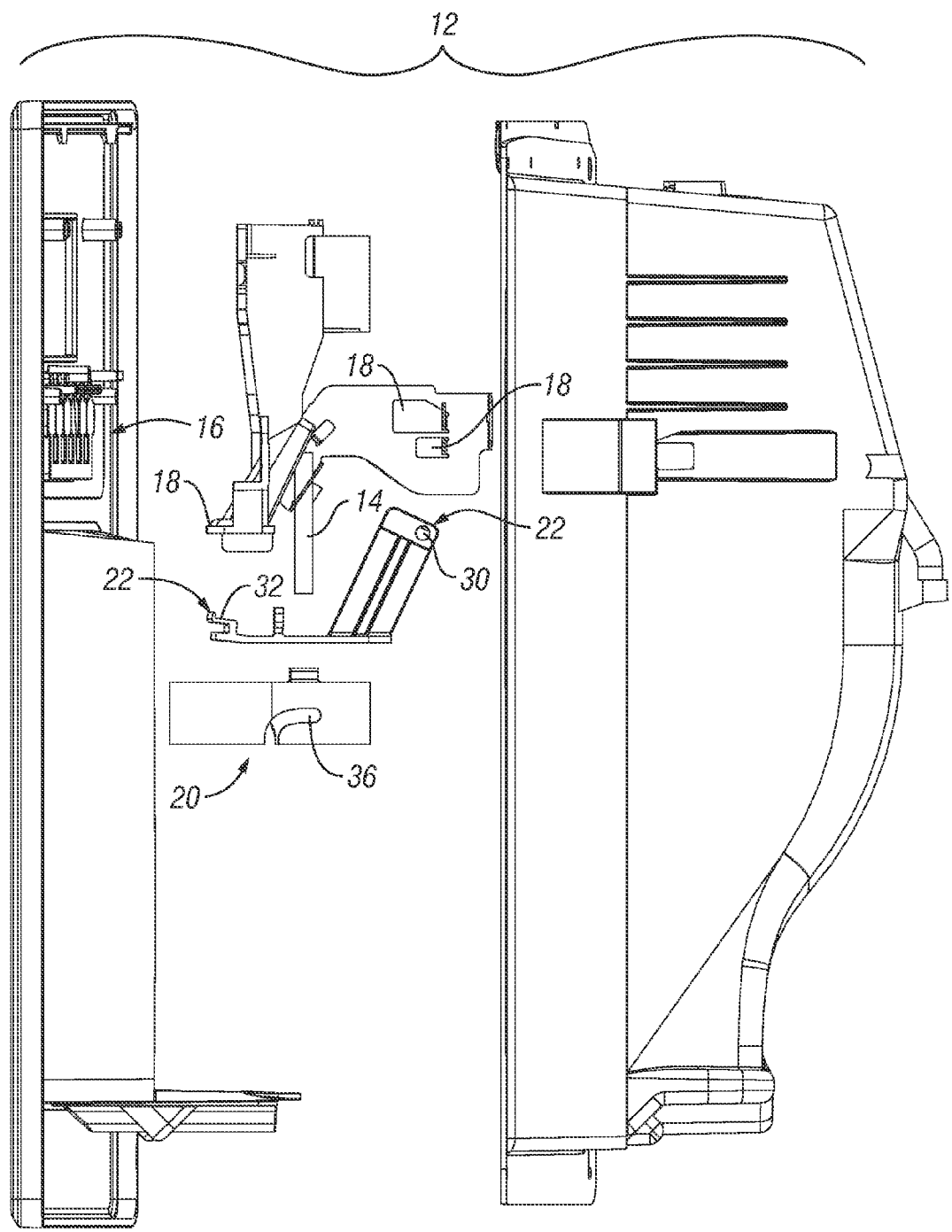
FIG. 3C is an exploded view of the indoor water dispenser of the prior art shown in FIG. 2 with an exploded illustration of one retrofit of the present invention.

FIG. 3C illustrates an exploded view of the indoor water dispenser 12 of the prior art shown in FIG. 1B. Indoor water dispenser 12 has several stock components or pre-existing connection points 18 (components or connection points existing as part of the dispenser from the time of manufacture) that connection geometries 22 can be connected to for securing adapter 20 to indoor water dispenser 12. Pre-existing connection points 18 of the indoor water dispenser 12 may include an existing bracket used in indoor water dispenser 12 or any interface, seam or mating surfaces between existing components of the indoor water dispenser 12, such as where two components provide a tight seam acting as a compression fit for holding one or more of connection geometries 22.

Figure 3D:
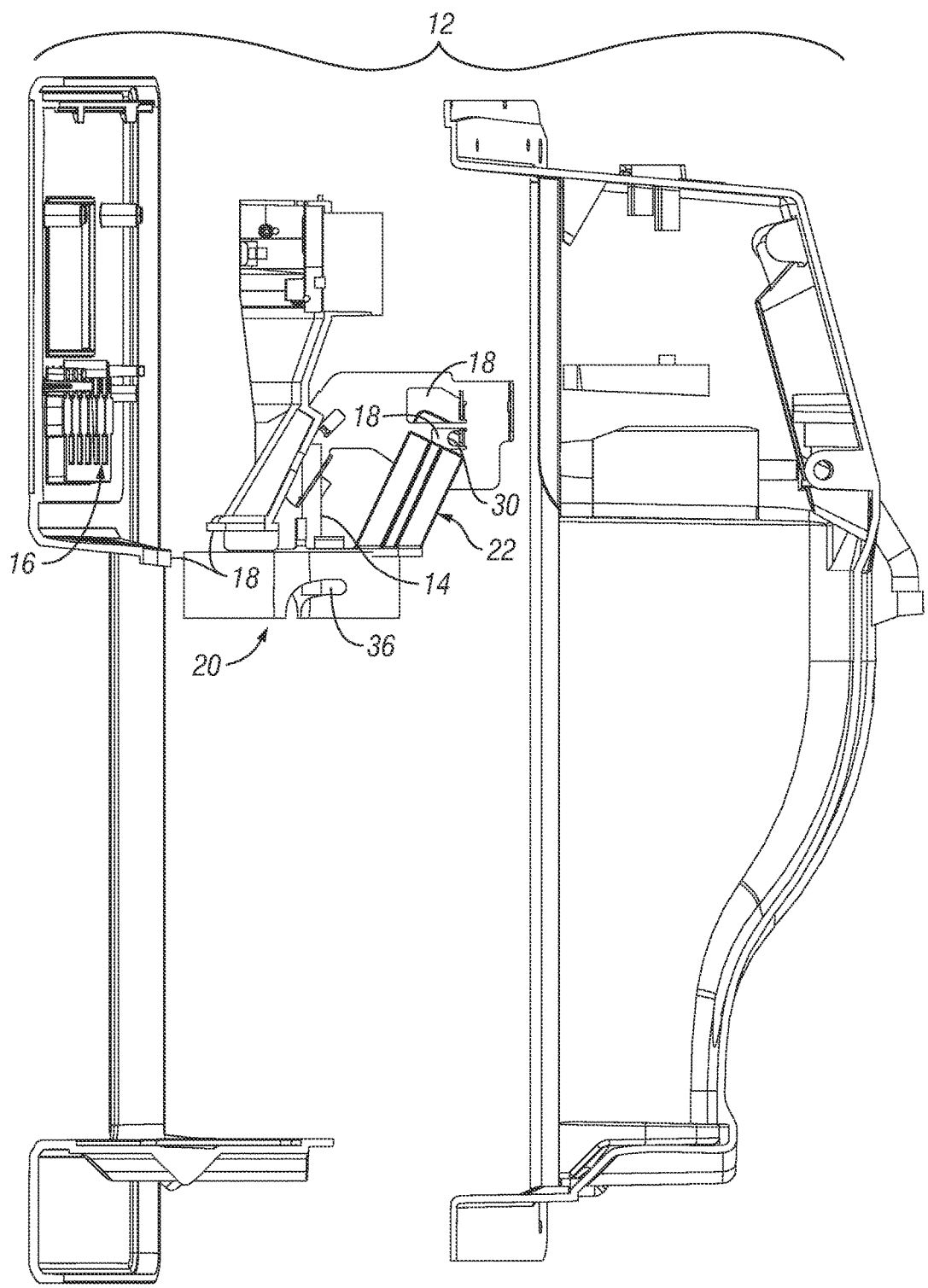
FIG. 3D is another exploded sectional view of the indoor water dispenser of the prior art shown in FIG. 2 with an assembled illustration of the retrofit according to an exemplary embodiment of the present invention.

FIG. 3D illustrates one aspect of how connection geometries 22 may be used to affix adapter 20 to pre-existing connection points 18 associated with the indoor water dispenser 12. For example, clip 30 may be used to secure about an existing bracket within the indoor water dispenser 12 as shown. Additionally, connection geometry 22 having the flange portion with lip 32 may be secured between tightly mated adjoining parts that provide a seam in compression (when indoor water dispenser 12 is assembled) for securing lip 32 against movement. Although FIGS. 3C and 3D illustrate indoor water dispenser 12 of the prior art in an exploded view, it should be appreciated that connection geometries 22 may be connected to pre-existing connection points 18 associated with the indoor water dispenser 12 without having to disassemble indoor water dispenser 12. For example, the user could select the appropriate connection geometry 22 to fit to adapter 20; connection geometry 22 may be specific to the brand, make, platform, or model of the indoor water dispenser 12. Preferably, connection geometry 22 would be first attached to pre-existing connection points 18 within the indoor water dispenser 12 and then adapter 20 would subsequently be attached to connection geometry 22 preferably without having to disassemble or remove components associated with the existing indoor water dispenser 12. Those skilled in the art can appreciate that adapter 20 could also be connected first to connection geometry 22 and then to pre-existing connection points 18. Connection geometries 22 are used to rigidly secure adapter 20 to the indoor water dispenser 12. To seal adapter 20 to the water outlet 14, a water outlet interface 24 is also provided. The water outlet interface 24 may be provided in or about aperture 26 so as to seal adapter 20 to water outlet 14. In one aspect, water outlet interface 24 may include one or more seals to seal about the outer perimeter (female connector) or inner perimeter (male connector) of water outlet 14 to prevent water from leaking at the water outlet interface 24 to maintain the pressure associated with water from water outlet 14 within adapter 20.

FIG. 2 illustrates a front elevation view of the indoor water dispenser 12 having been retrofitted with adapter 20. As previously discussed, adapter 20 provides a universal interface for connecting other components thereto. Additionally, adapter 20 could have aesthetics to match that of the indoor water dispenser 12. Furthermore, adapter 20, in a preferred form, would permit use of indoor water dispenser 12 without interference from adapter 20. Regardless, adapter 20 could be configured to be permanently or removably attached to indoor water dispenser 12 using adapter 20. Numerous types of capsules, such as additive capsule 40 illustrated in FIG. 4 may be attached to adapter 20 alone or using some other attachment mechanism such as capsule holder 44. Depending on the type of additive capsule 40 or container being used, adapter 20 may include one or more channels to direct all the water from the water outlet 14 around the additive capsule 40, direct at least a portion of the water from the water outlet 14 to and/or through the additive capsule 40, or direct all the water from the water outlet 14 to and/or through additive capsule 40. In the broadest sense, additive capsule 40 provides a reservoir for housing an additive component. It should be appreciated that the additive component housed within additive capsule 40 could be a powder, grounds, a liquid, an aroma, or other like flavoring media. Additionally, the additive may be powdered, ground, leaf-based, or liquid. The additive may be insoluble or soluble. The additive could also be a carbonating agent or a brew. Those skilled in the art should appreciate that additive capsule 40 could, instead of adding a component to the water stream from the water outlet 14, take away a component already existing in or added to the water stream from the water outlet 14, such as in the case where capsule 40 has a filtering component for filtering the water stream or where an additive is combined with the water stream then filtered out leaving an additive such as a flavor or aroma with the water stream being dispensed.

Figure 4:
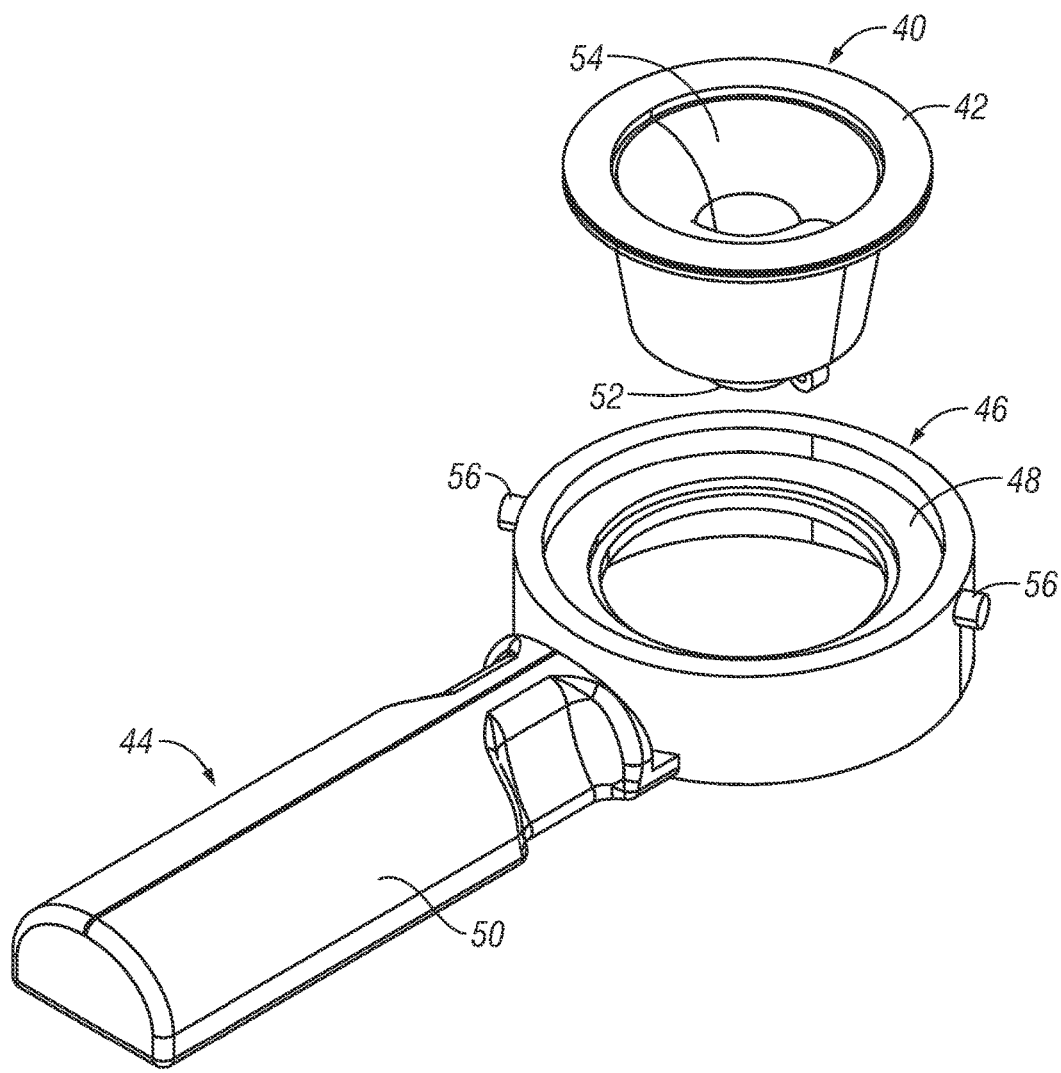
FIG. 4 is an exploded perspective view of an additive capsule and capsule holder according to an exemplary embodiment of the present invention.
Figure 5A:
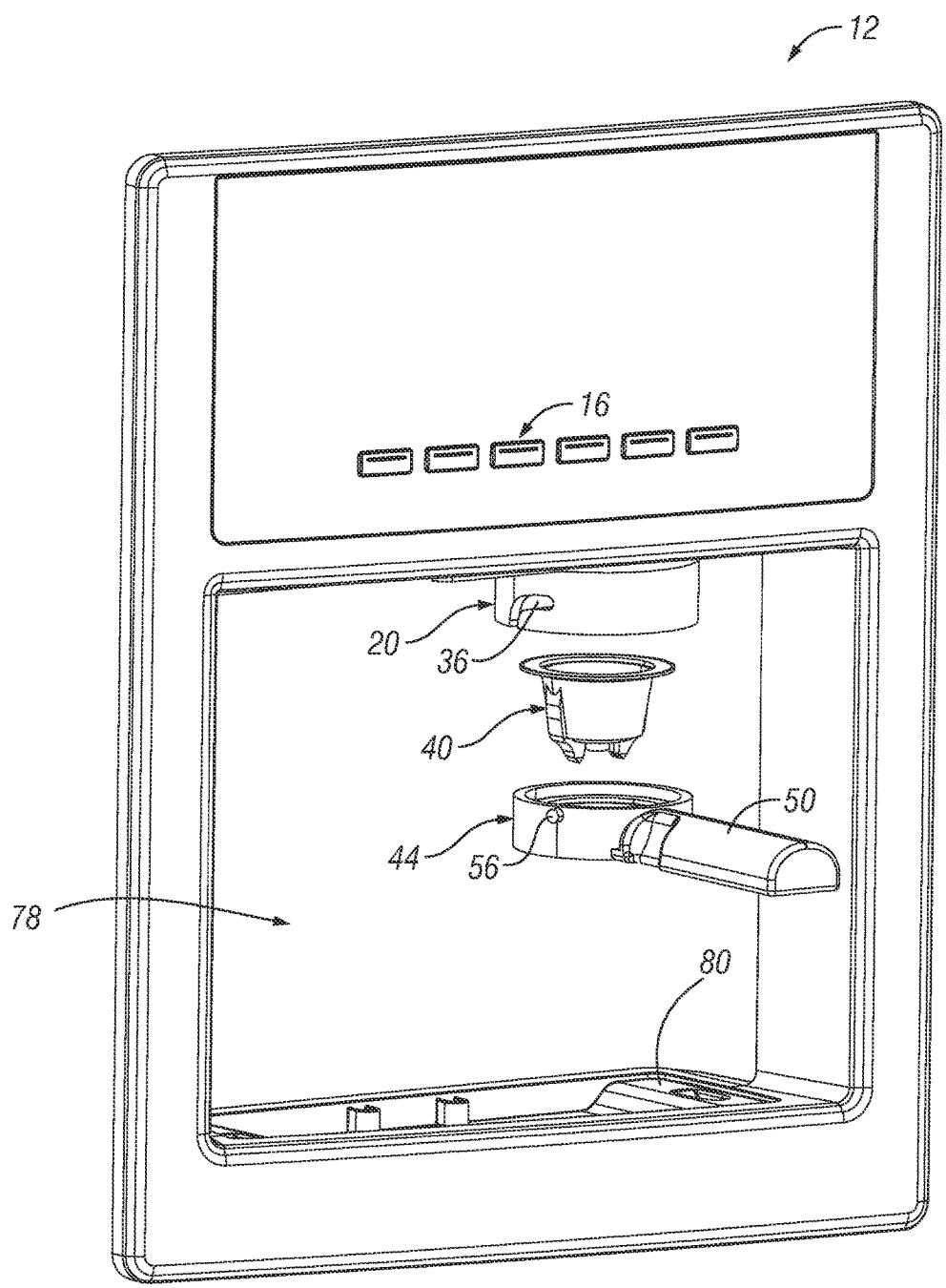
FIG. 5A is a perspective view of the indoor water dispenser of the prior art shown in FIG. 2 with an exploded illustration of the retrofit, additive capsule and capsule holder according to an exemplary embodiment of the present invention.
Figure 5B:
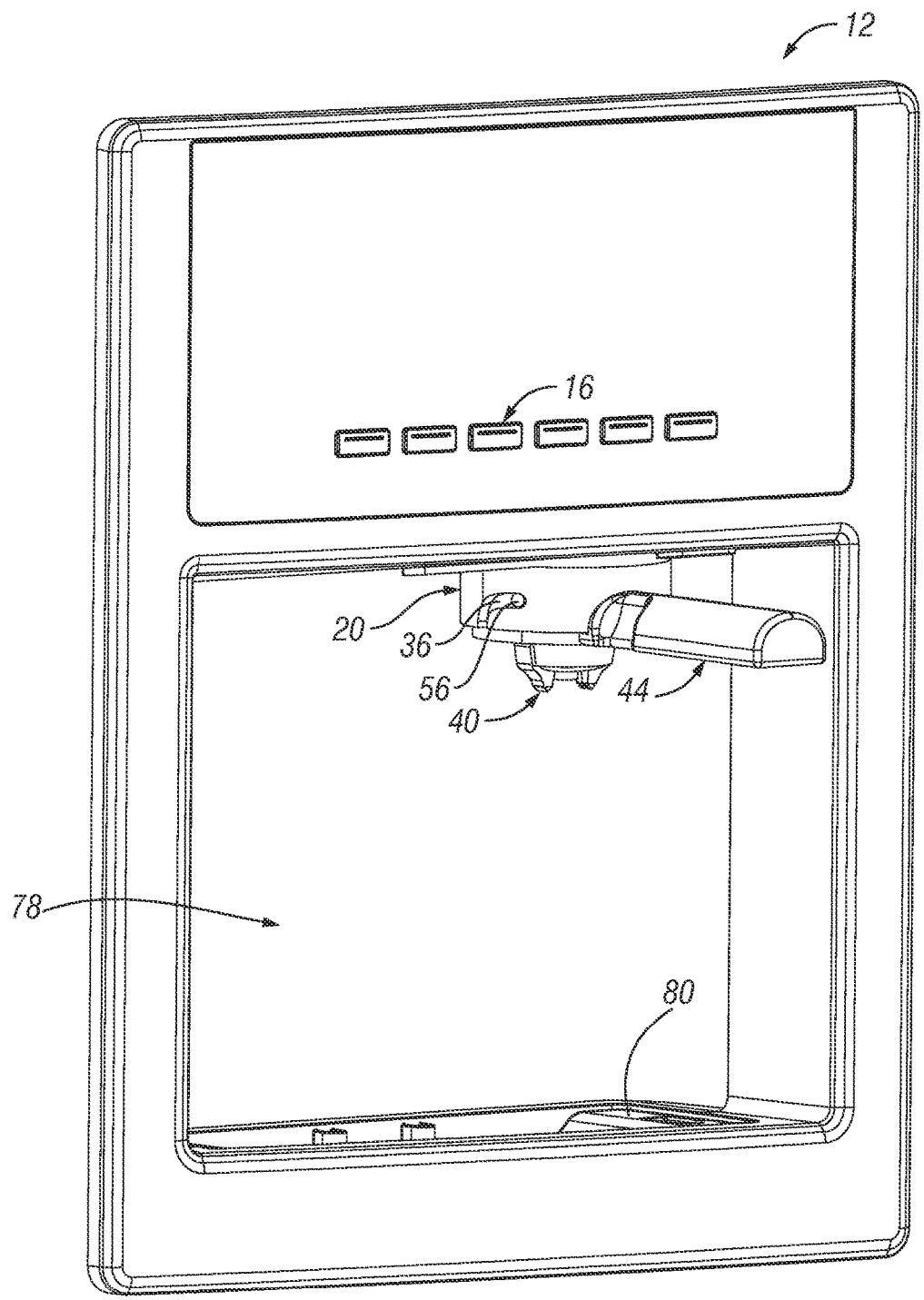
FIG. 5B is a perspective view of the indoor water dispenser of the prior art shown in FIG. 2 with an assembled illustration of the adapter, additive capsule, and capsule holder according to an exemplary embodiment of the present invention.
Figure 7:
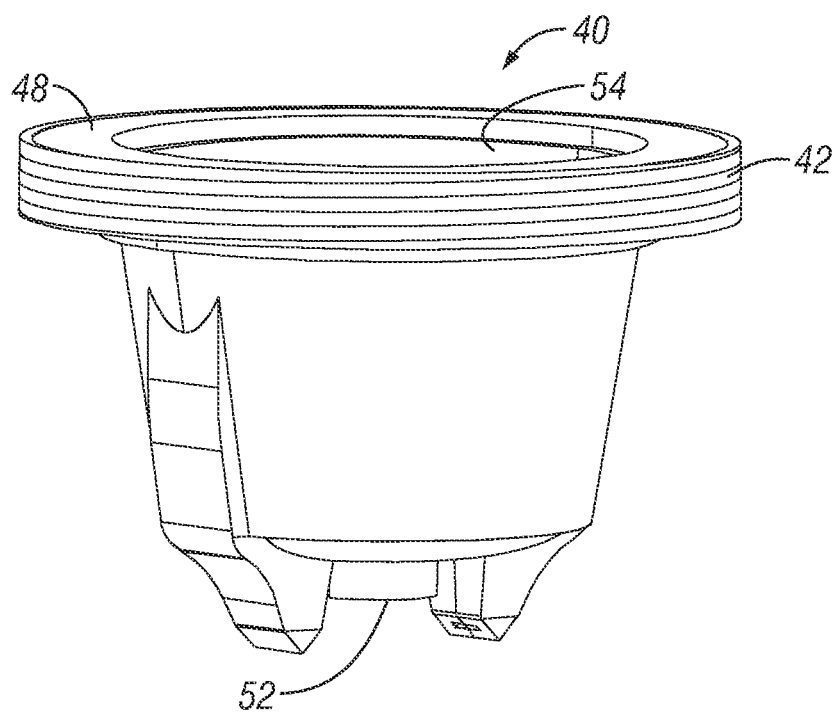
FIG. 7 is a perspective view of an additive capsule according to an exemplary embodiment of the present invention.
Figure 8A:
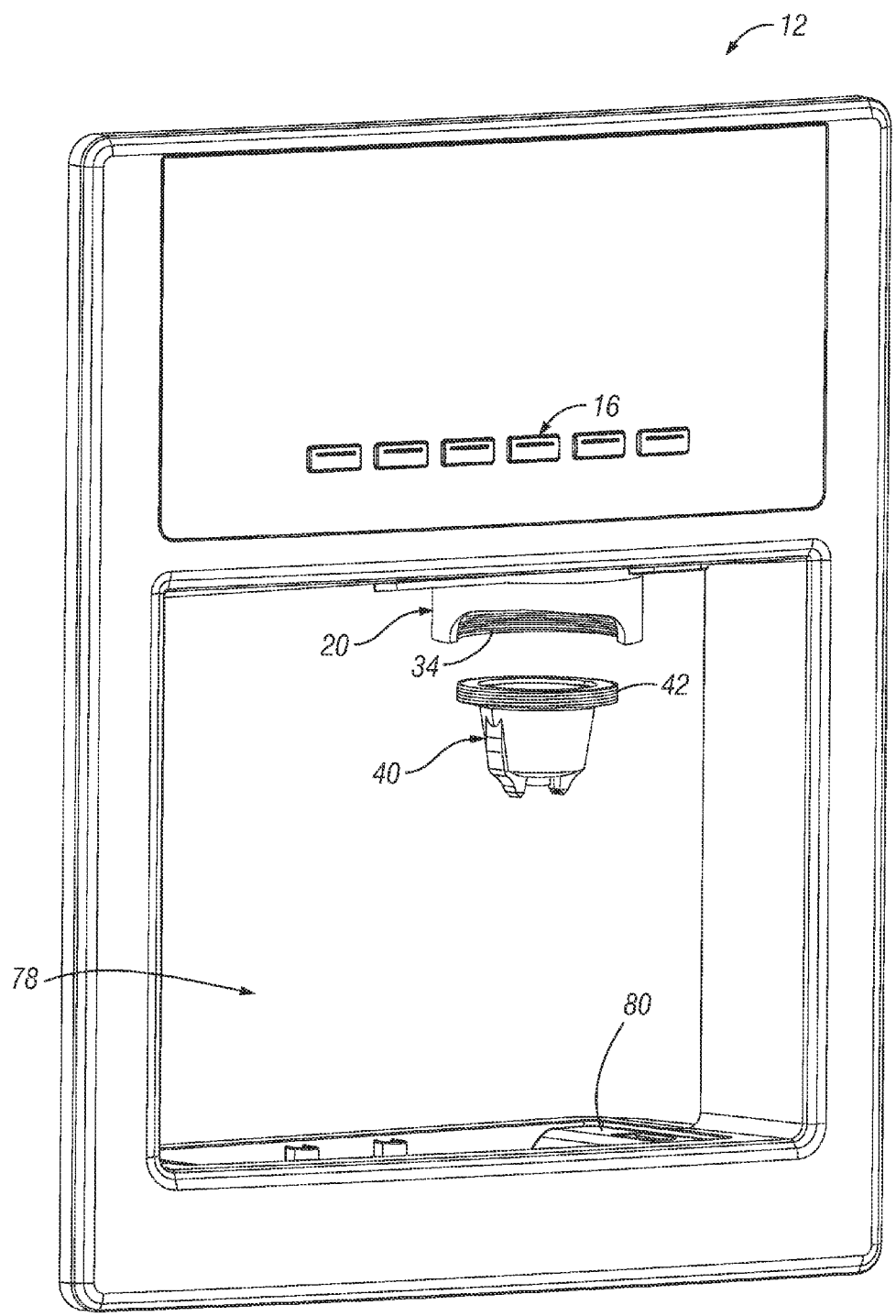
FIG. 8A is a perspective view of the indoor water dispenser of the prior art shown in FIG. 2 with the additive capsule shown in FIG. 6D and another adapter according to an exemplary embodiment of the present invention.
Figure 8B:
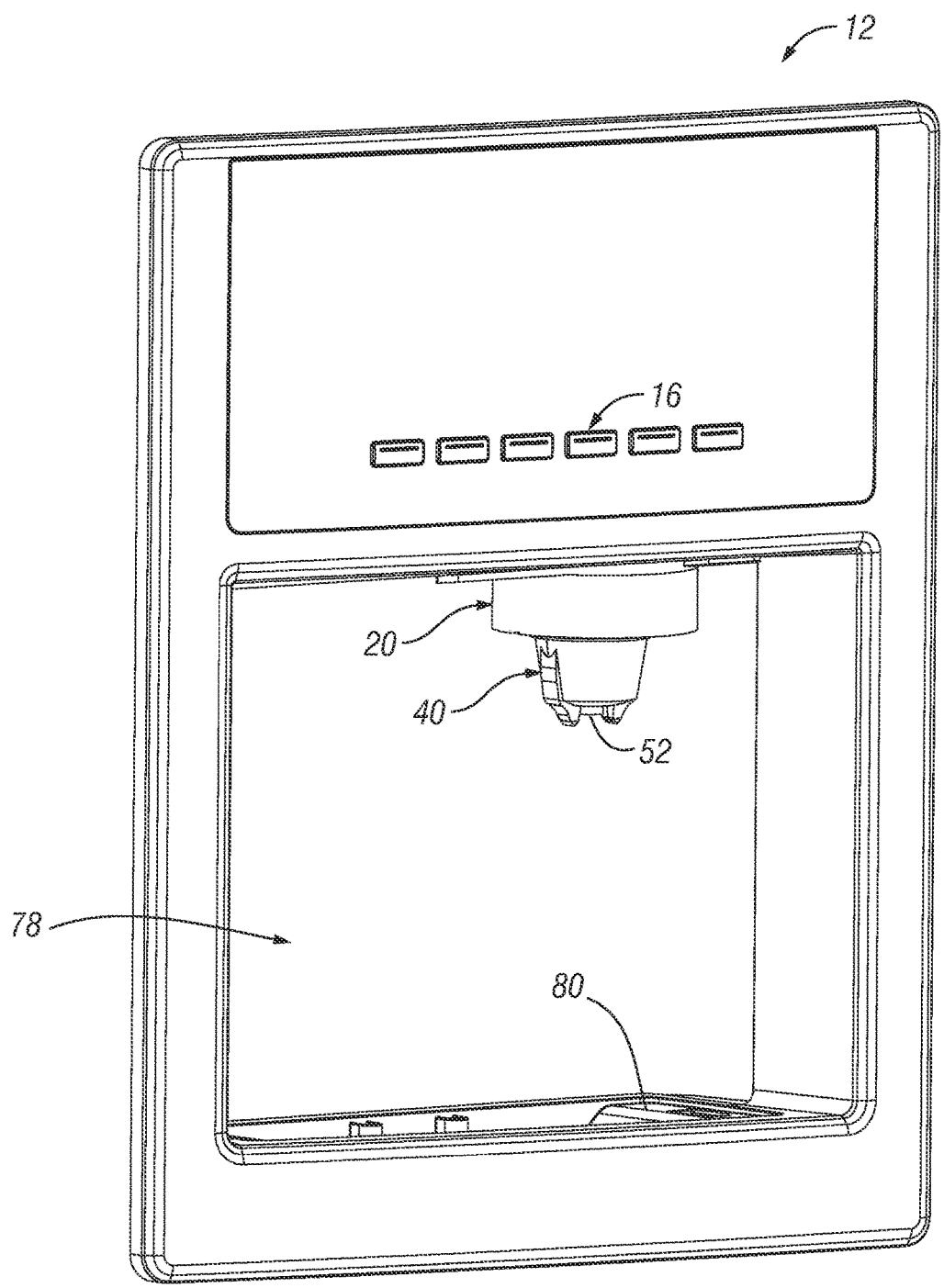
FIG. 8B is a perspective view of the indoor water dispenser of the prior art shown in FIG. 8A with the additive capsule and adapter assembled according to an exemplary embodiment of the present invention.

Structurally, additive capsule 40 may include an inlet 54 and outlet 52 for passing a portion of water from water outlet 14 therefrom to dispense an enhanced beverage or for simply dispensing additive from additive capsule 40 without passing water directly through additive capsule 40. Additive capsule 40 may also include a connection interface 42 adapted to mate with universal attachment interface 34 of adapter 20. Connection interface 42 of additive capsule 40 may of itself include a connection mechanism for securing to adapter 20. For example, additive capsule 40 and adapter 20 could each have threads such that additive capsule 40 could be threaded into adapter 20 to attach additive capsule 40 to adapter 20 as best illustrated in FIGS. 7, 8A and 8B. Once additive capsule 40 has been used it could be unthreaded from adapter 20 and discarded. Additive capsule 40 could be adapted to be refillable, reusable or disposed as a consumable part. For example, additive capsule 40 could have one or more parts that by disassembling them allow the user to refill or recharge the additive capsule 40 with an additive component, flavoring or aroma. Alternatively, if additive capsule 40 is a consumable part, additive capsule 40 could be removed from adapter 20, discarded and replaced with a new additive capsule 40. Additive capsule 40 could also be connected to adapter 20 using a capsule holder 44 as best illustrated in FIGS. 4, 5A and 5B. Capsule holder 44 could have a handle 50 for gripping, pins 56 for inserting and sliding into grove 36 in adapter 20, and universal attachment interface 46 having a seal 48 to seal additive capsule 40 to adapter 20. Capsule holder 44 should not be construed as being limited to pins 56 as a connection mechanism for connecting capsule holder 44 to adapter 20. One skilled in the art could appreciate that numerous types of connection mechanisms could be used to attach capsule holder 44 to adapter 20. For example, additive capsule 40 could be have a threaded or quick-coupler interface for securing and sealing additive capsule 40 to adapter 20 to maintain the pressure of the water from the water outlet 14 within adapter 20 and to prevent water from leaking at any one or more of the interfaces between the adapter 20, additive capsule 40 and capsule holder 44.

FIGS. 5A and 5B illustrate indoor water dispenser 12 of the prior art having been retrofitted with adapter 20. With adapter 20 in place, additive capsule 40 may be connected to adapter 20 alone or with the use of capsule holder 44 as shown in FIG. 4. The sealed connection of additive capsule 40 to adapter 20 allows use of the water component provided by the indoor water dispenser 12 to be combined with an additive provided by additive capsule 40 to create an enhanced beverage when water is dispensed from water outlet 14 of indoor water dispenser 12.

Figure 6A:
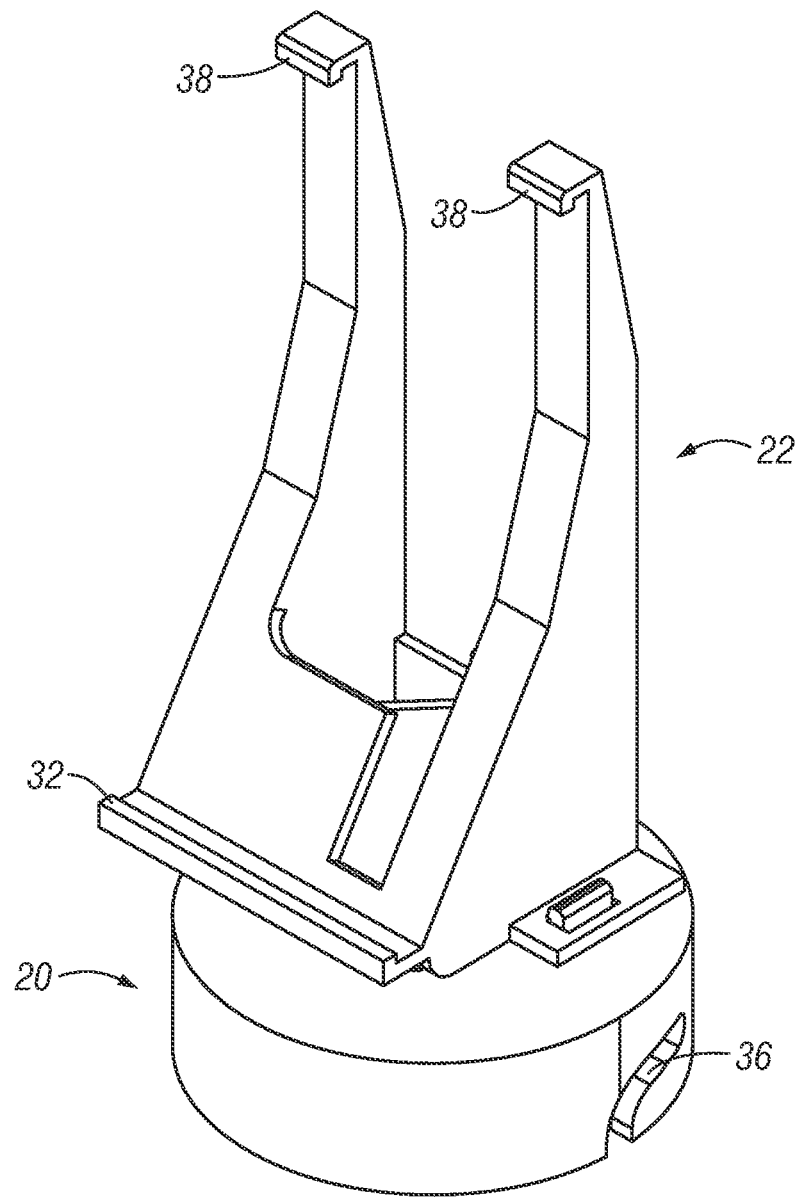
FIG. 6A is a perspective view of the adapter shown in FIG. 3A with connection geometry according to another exemplary aspect of the present invention.

FIG. 6A illustrates another exemplary embodiment of adapter 20 shown in FIG. 3A having an alternative connection geometry 22. Similar to adapter 20 and connection geometry 22 shown in FIG. 3B, connection geometry 22 shown in FIG. 6A has hooks 38 and flange with a lip 32 for connecting to one or more preexisting connection points 18 associated with the indoor water dispenser 12.

Figure 6B:
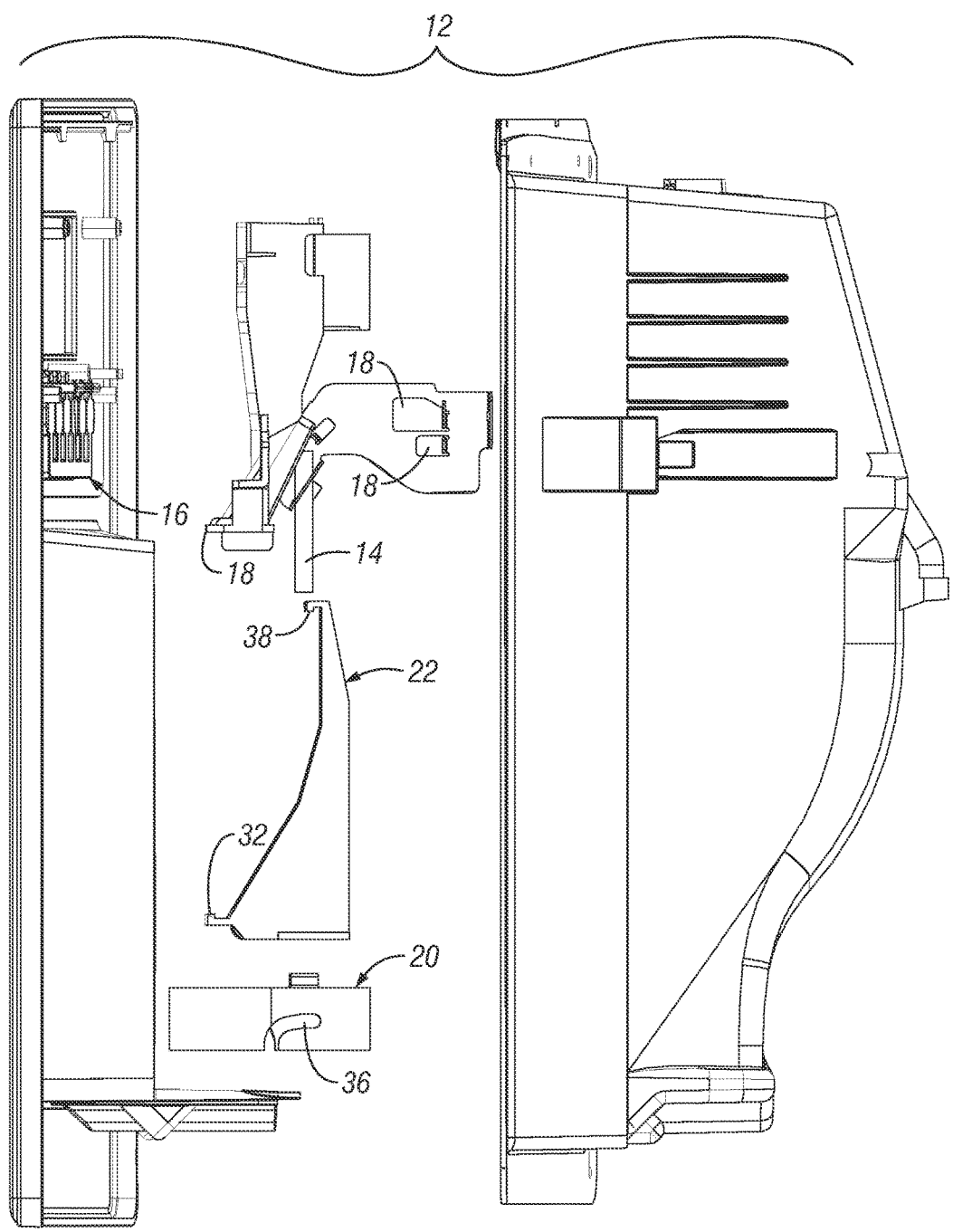
FIG. 6B is an exploded view of the indoor water dispenser of the prior art shown in FIG. 2 with an exploded illustration of the retrofit shown in FIG. 6A according to an exemplary embodiment of the present invention.
Figure 6C:
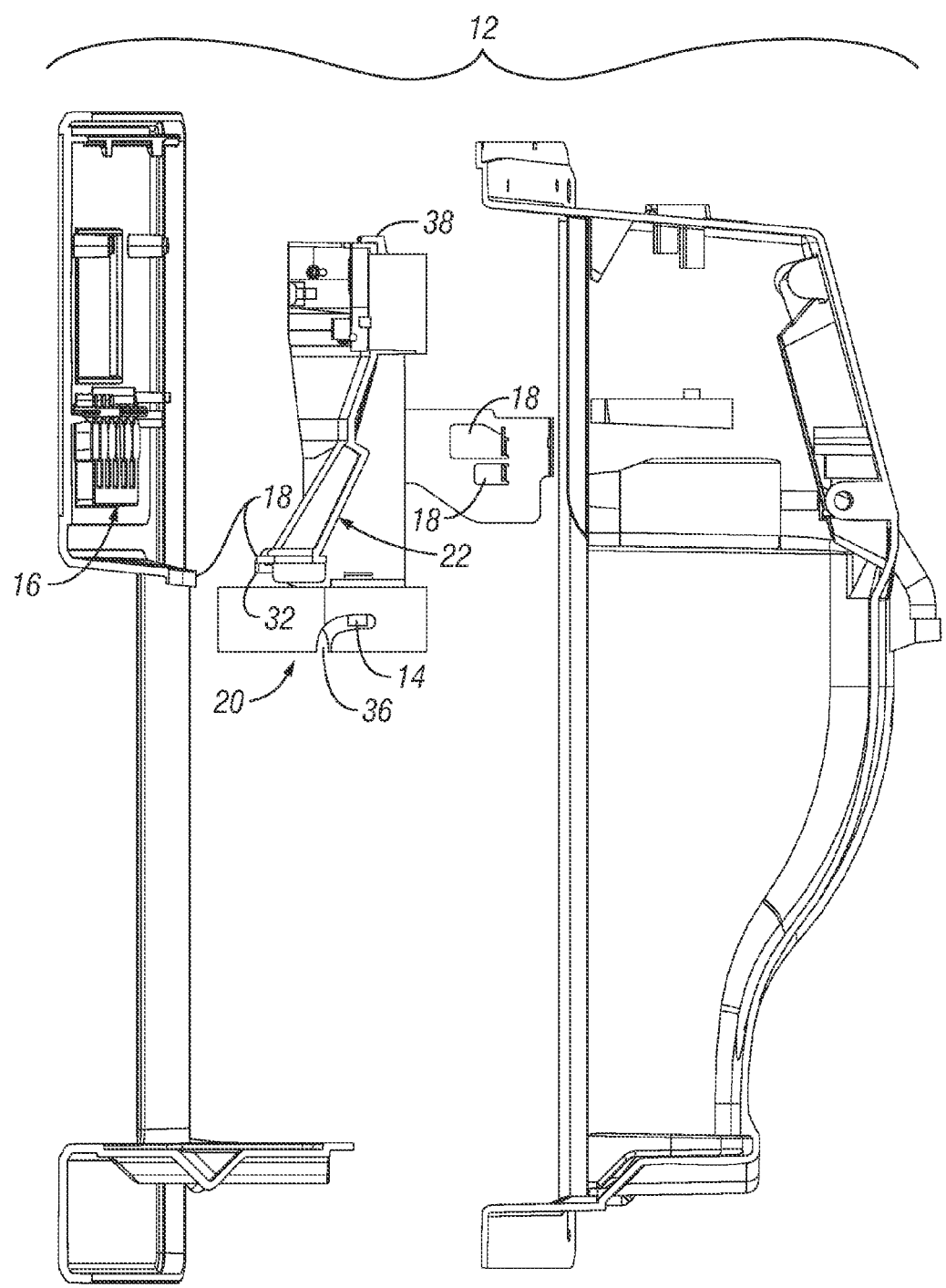
FIG. 6C is an exploded view of the indoor water dispenser of the prior art shown in FIG. 2 with an assembled illustration of the retrofit according to an exemplary embodiment of the present invention.

FIGS. 6B and 6C illustrate an exploded view of indoor water dispenser 12 of the prior art shown in FIG. 1B. Similar to the proceeding description for FIGS. 3C and 3D, adapter 20 and connection geometry 22 configured with hook 38 and flange with lip 32 attach to preexisting connection points 18 associated with indoor water dispenser 12. FIG. 6B illustrates how connection geometry 22 is used to affix or secure adapter 20 to the indoor water dispenser 12. In FIG. 6C, hook 38 and the flange with lip 32 attach to existing connection points 18 associated with indoor water dispenser 12. One skilled in the art should appreciate that connection geometries 22 associated with adapter 20 could be configured to connect not only to preexisting connection points 18 associated with indoor water dispenser 12 but with any preexisting connection points 18 associated with refrigerator 10. As previously mentioned, in the preferred form, connection geometry 22 may be moved into position and secured to preexisting connection points 18 associated with indoor water dispenser 12 without having to disassemble or remove components or parts of indoor water dispenser 12. Thus, the user may attach connection geometry 22 to preexisting connection points 18 associated with indoor water dispenser 12 and subsequently attach adapter 20 to connection geometry 22. Once secured to the indoor water dispenser 12, adapter 20 may be used to attach other components such as additive capsule 40 to the indoor water dispenser 12 for dispensing at least a portion or all water from water outlet 14 there-through for creating an enhanced beverage. One skilled in the art should appreciate that the retrofit of the present invention is not limited to specific instances of cold water dispensing from water outlet 14. For example, where refrigerator 10 has existing stock components for providing hot, carbonated, or other types of water at the indoor water dispenser 12, adapter 20 and additive capsule 40 could be used to provide a hot or carbonated beverage with additives using existing stock components associated with refrigerator 10. As a retrofit piece, the uses for adapter 20 would only be limited by the varying types of liquid components provided by the host product or the refrigerator 10. For example, if refrigerator 10 has an indoor water dispenser 12 that only provides cold water at the water outlet, adapter 20 and additive capsule 40 could be used to provided cold water enhanced beverages to the user. If, for example, refrigerator 10 has stock components to create and provide hot water at the indoor water dispenser 12, adapter 20 and additive capsule 40 could be used to provide the user with a hot water enhanced beverage, such as coffee, powdered drinks or tea. Furthermore, if refrigerator 10 has stock components to create and provide carbonated water at indoor water dispenser 12, adapter 20 and additive capsule 40 could be used to provide the user with enhanced carbonated beverages, such as sparkling mineral water or flavored soda.

FIG. 7 illustrates another exemplary aspect of additive capsule 40 shown in FIG. 4. Additive capsule 40 has a threaded connection interface 42. As previously mentioned, connection interface 42 should not be construed as being limited to any one type of connection. For example, connection interface could include another connection mechanism such as a quick-coupler, gasket-seal, compression-fit or other attaching interface. In the threaded embodiment, adapter 20 may include a female threaded interface (as illustrated in FIG. 8A) and additive capsule 40 may include a male threaded interface (as illustrated in FIG. 7) for connecting the two together (as illustrated in FIG. 8B). Capsule 40 may also include a sealing interface 48, separate from or part of connection interface 42 to seal off mating surfaces between adapter 20 and additive capsule 40 to prevent leaking and to maintain pressure of the water from the water outlet 14 within the retrofit.

Figure 9:
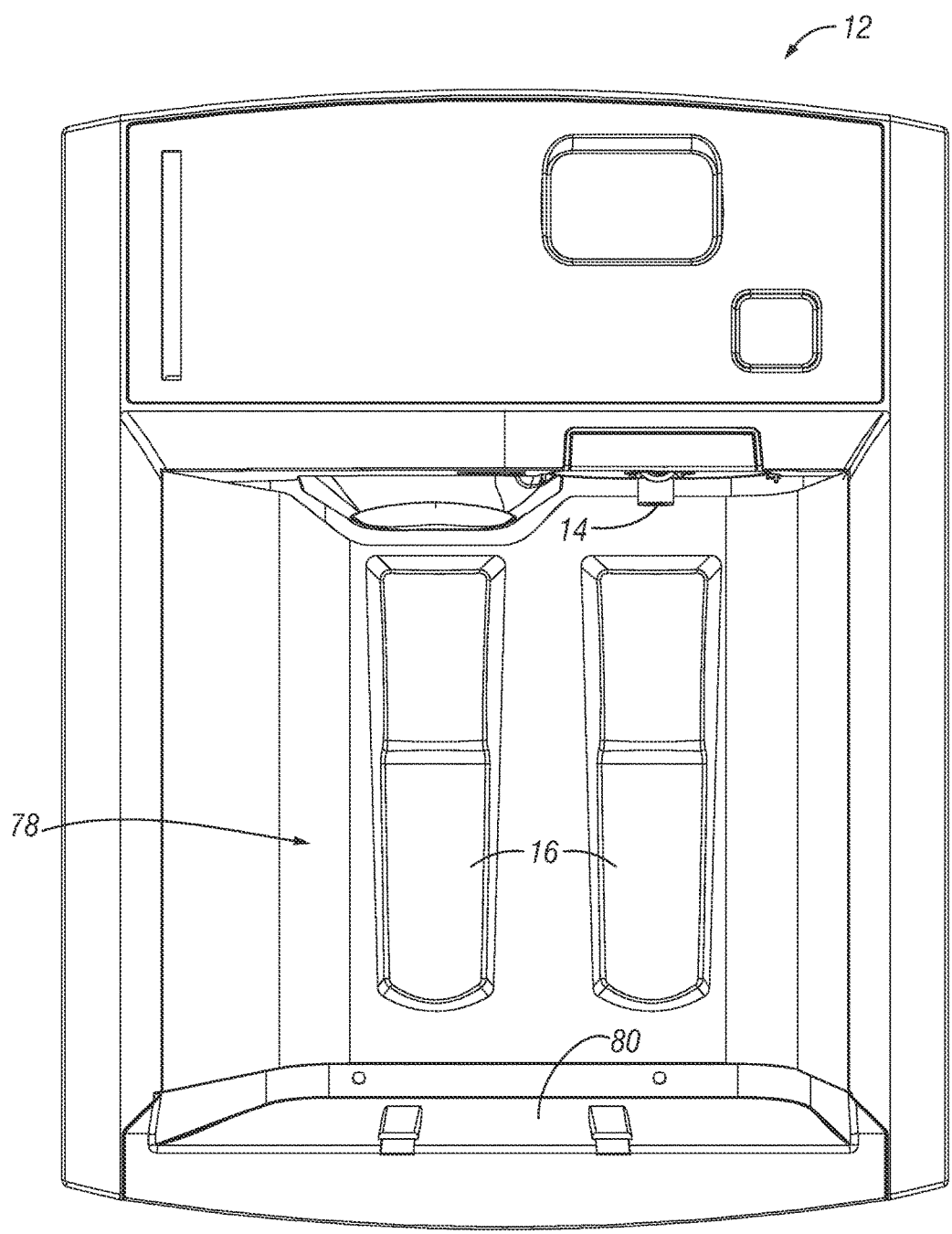
FIG. 9 is a front elevation view of another indoor water dispenser of the prior art.
Figure 10:
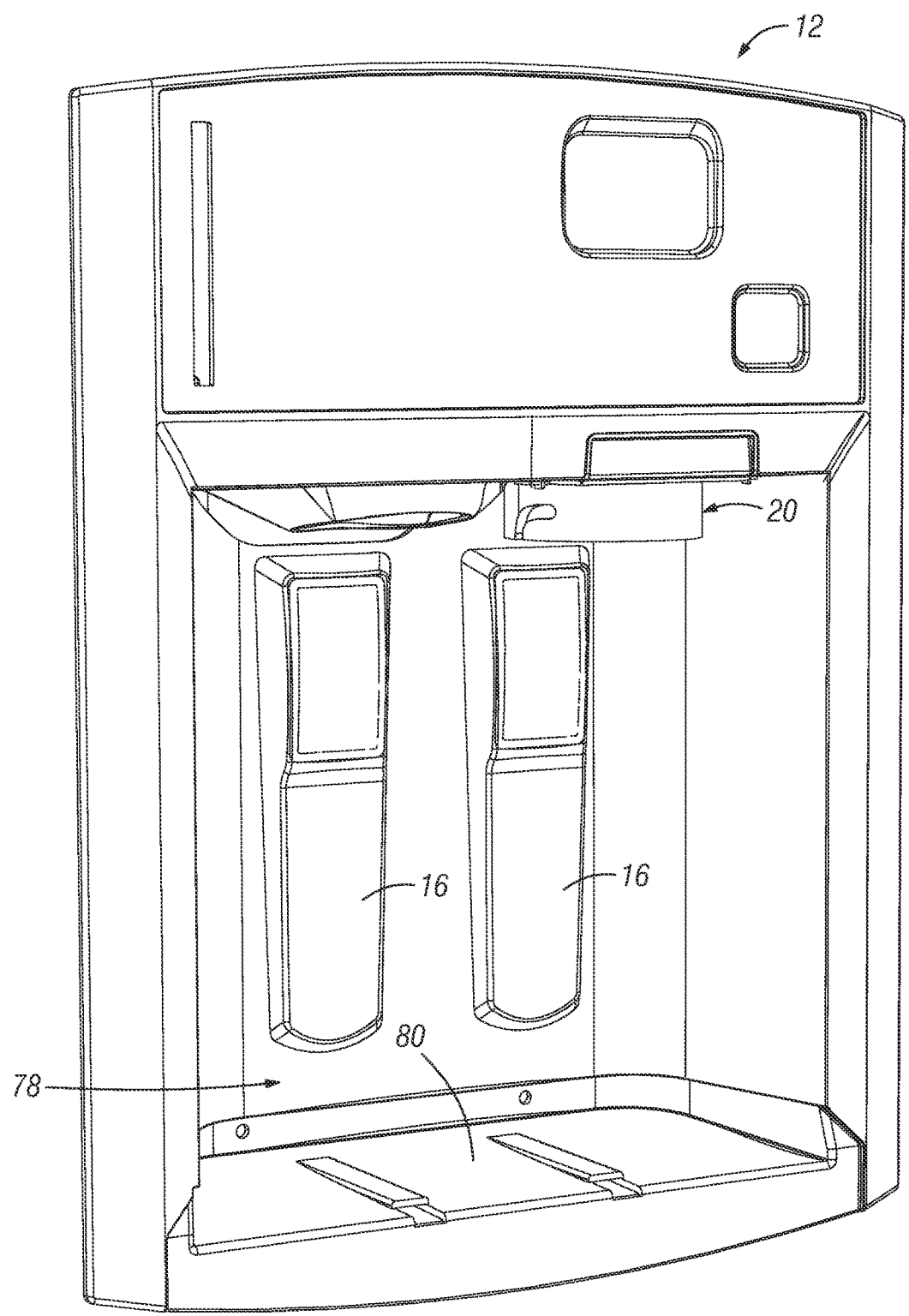
FIG. 10 is a perspective view of the indoor water dispenser of the prior art shown in FIG. 9 retrofitted with another exemplary embodiment of the present invention.
Figure 11A:
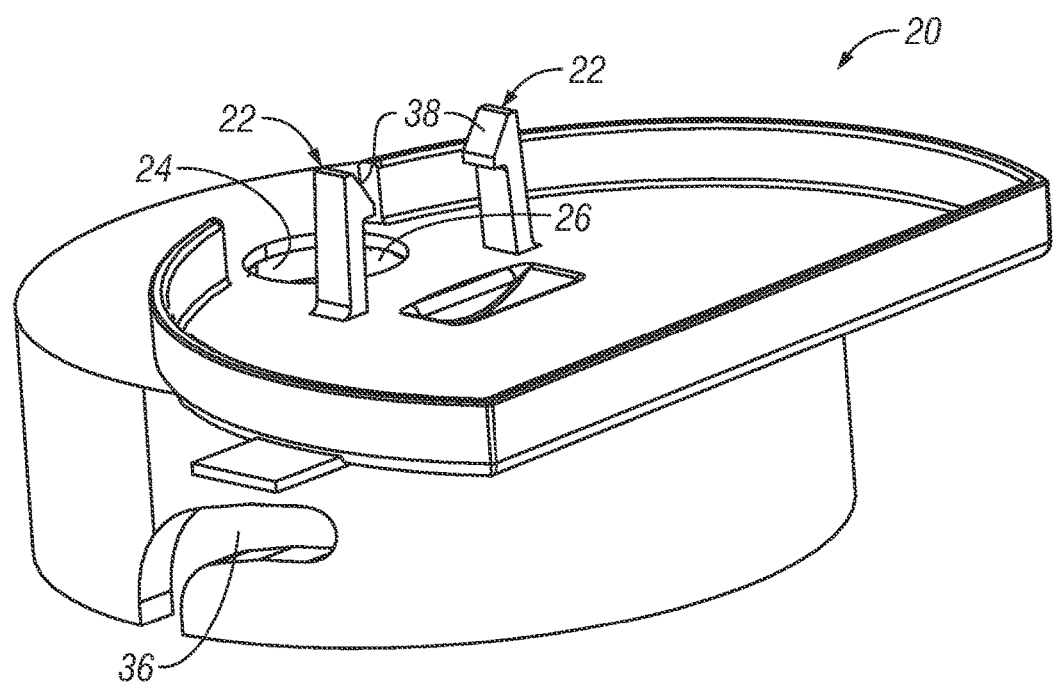
FIG. 11A is a perspective view of the adapter shown in FIG. 10.

FIG. 9 is front elevation view of another indoor water dispenser of the prior art. Like indoor water dispenser 12 shown in FIG. 1B, the indoor water dispenser 12 in FIG. 9 has a water outlet 14 and controls 16 for operating dispenser 12. Also, like FIG. 2, indoor water dispenser 12 of the prior art shown in FIG. 10 is retrofitted with adapter 20 which connects to indoor water dispenser 12 and seals about water outlet 14 for connecting other components thereto. FIG. 11A illustrates another exemplary embodiment of adapter 20. Similar to adapter 20 shown in FIG. 3A, adapter 20 in FIG. 11A has one or more grooves for securing one or more other components thereto. Additionally, aperture 26 is provided through the body of adapter 20 to provide a water outlet interface 24. Connection geometries 22 are also provided having one or more hooked prongs 38 for connecting adapter 20 to one or more preexisting connection points 18 at indoor water dispenser 12.

Figure 11B:
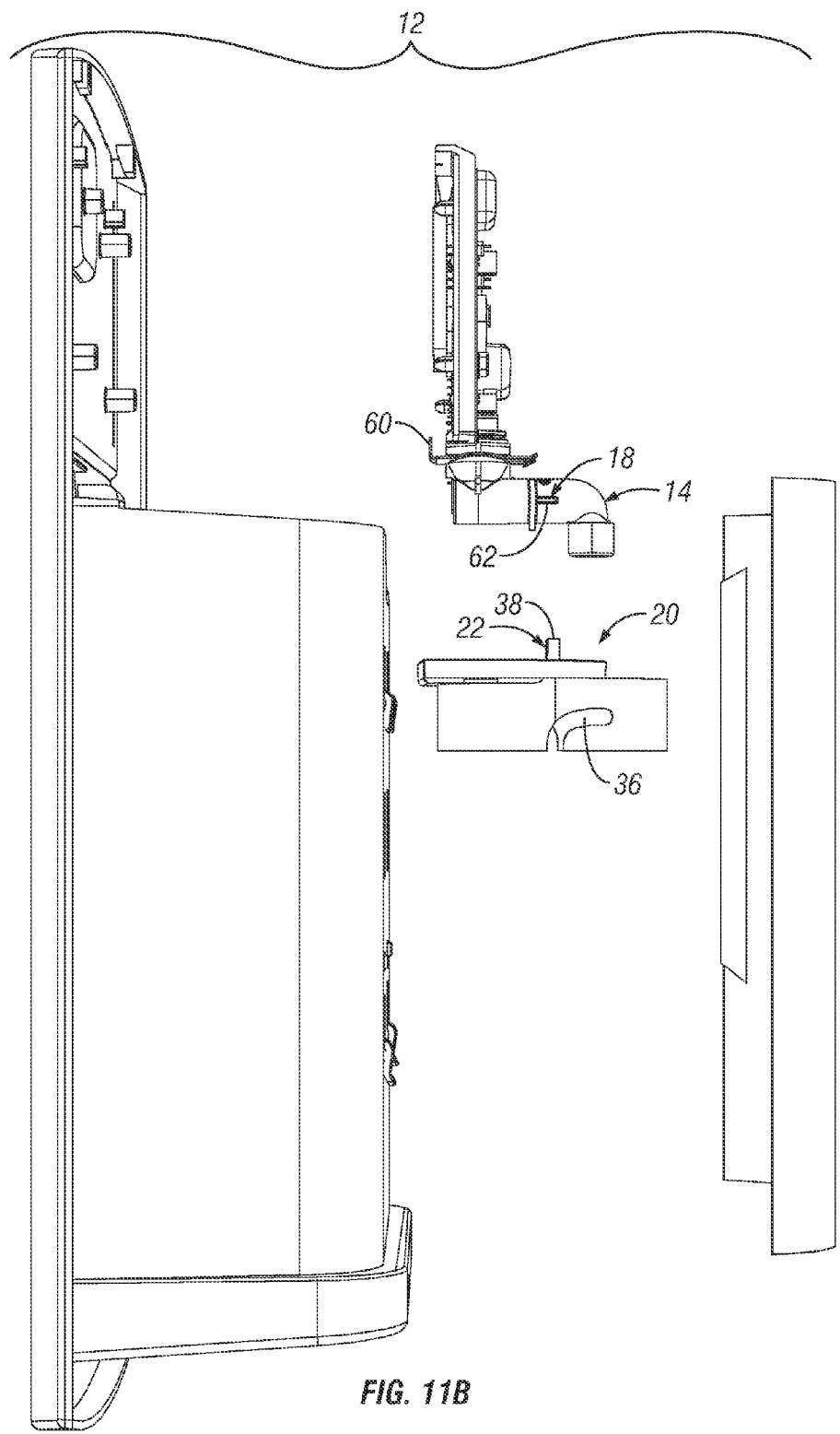
FIG. 11B is an exploded view of the indoor water dispenser shown in FIG. 10 with an exploded illustration of the adapter according to an exemplary embodiment of the present invention.
Figure 11C:
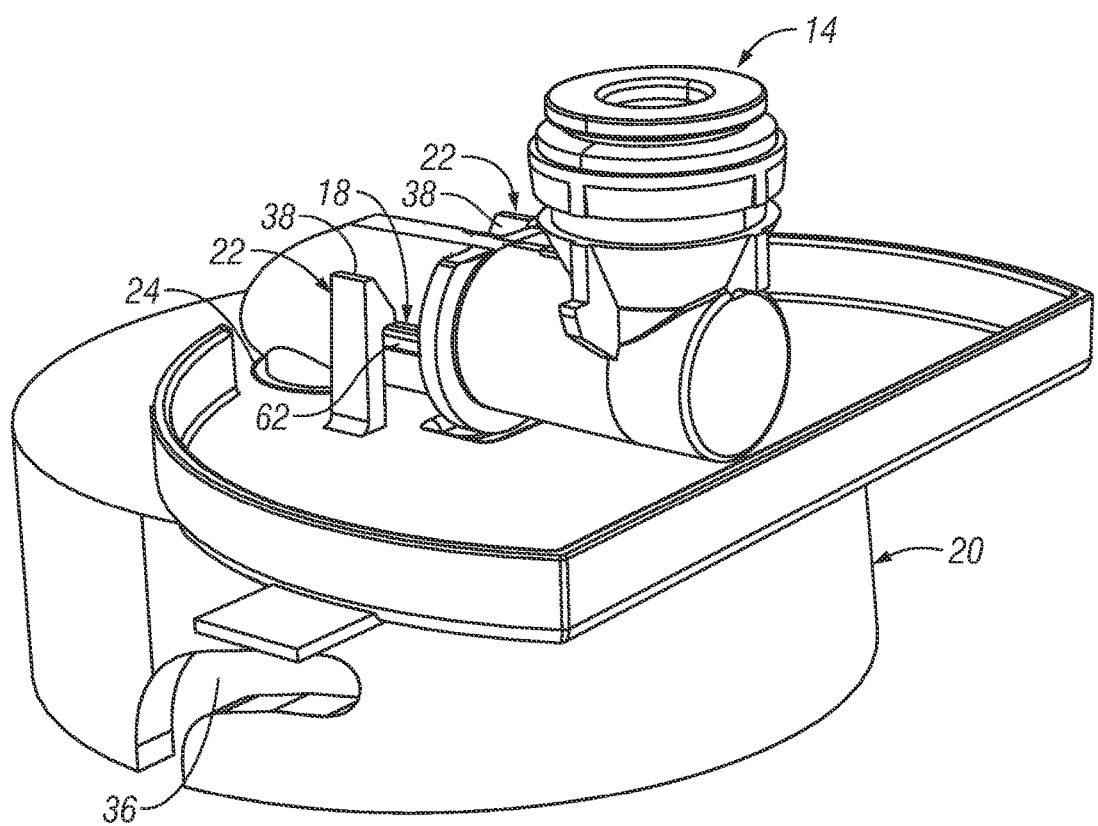
FIG. 11C is a perspective view of the adapter connected to the water outlet of the indoor water dispenser of the prior art shown in FIG. 11B according to an exemplary embodiment of the present invention.
Figure 11D:
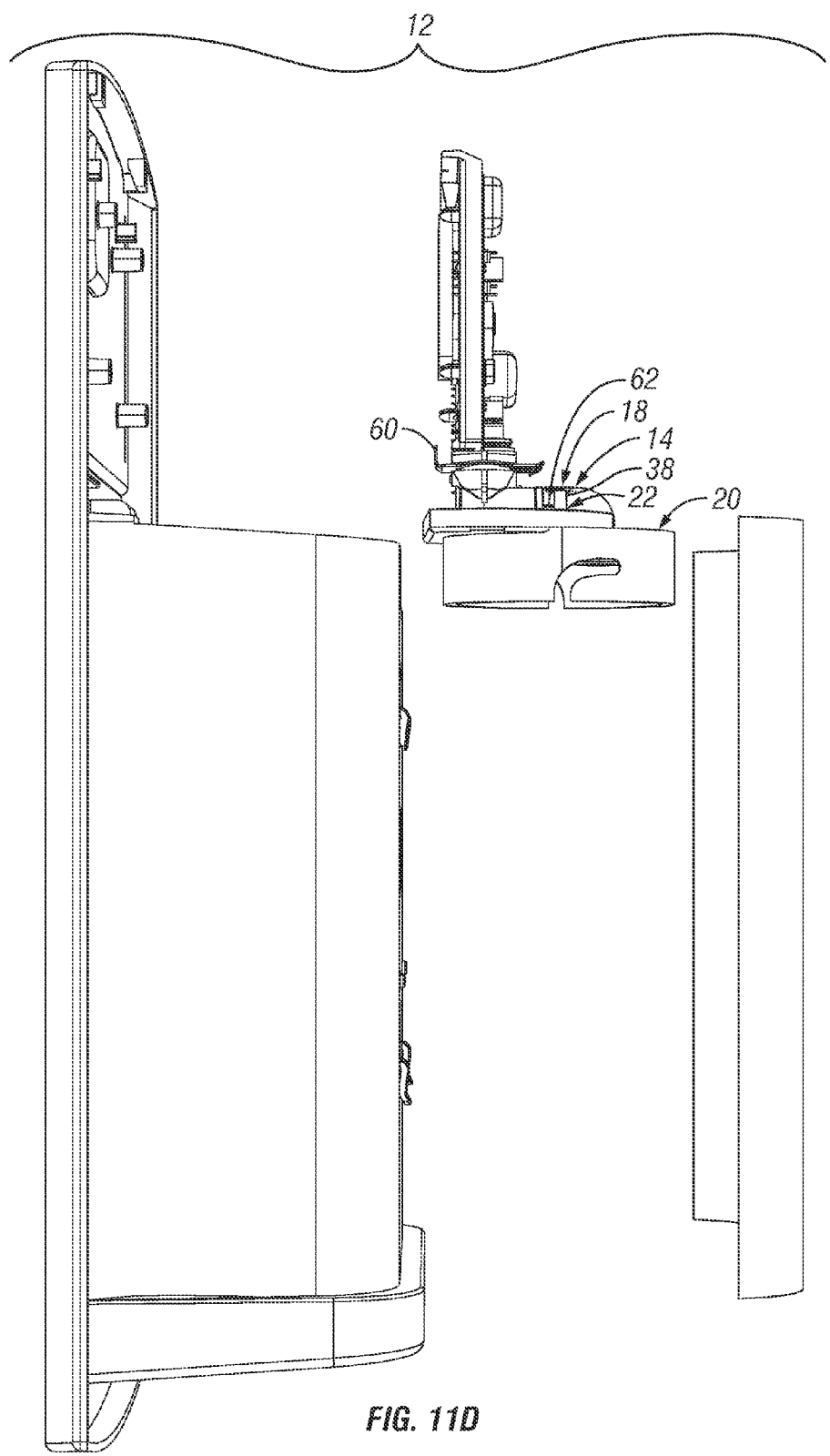
FIG. 11D is an exploded view of the indoor water dispenser of the prior art shown in FIG. 10 with an assembled illustration of retrofit shown in FIG. 11C according to an exemplary embodiment of the present invention.
Figure 12A:
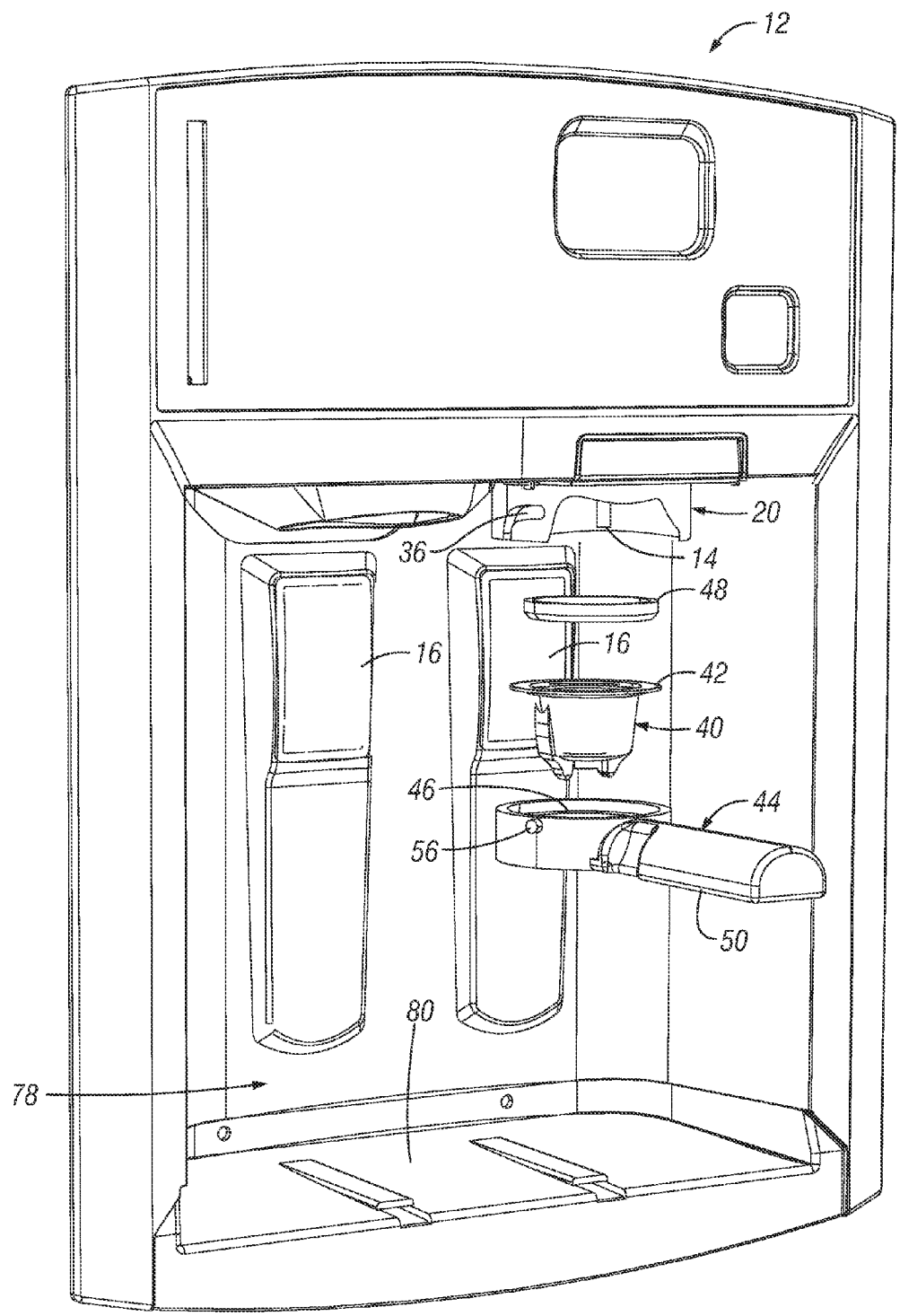
FIG. 12A is a perspective view of the indoor water dispenser of the prior art shown in FIG. 10 with an exploded illustration of the retrofit adapter shown in FIG. 11A with the additive capsule and capsule holder shown in FIG. 4 according to an exemplary embodiment of the present invention.
Figure 12B:
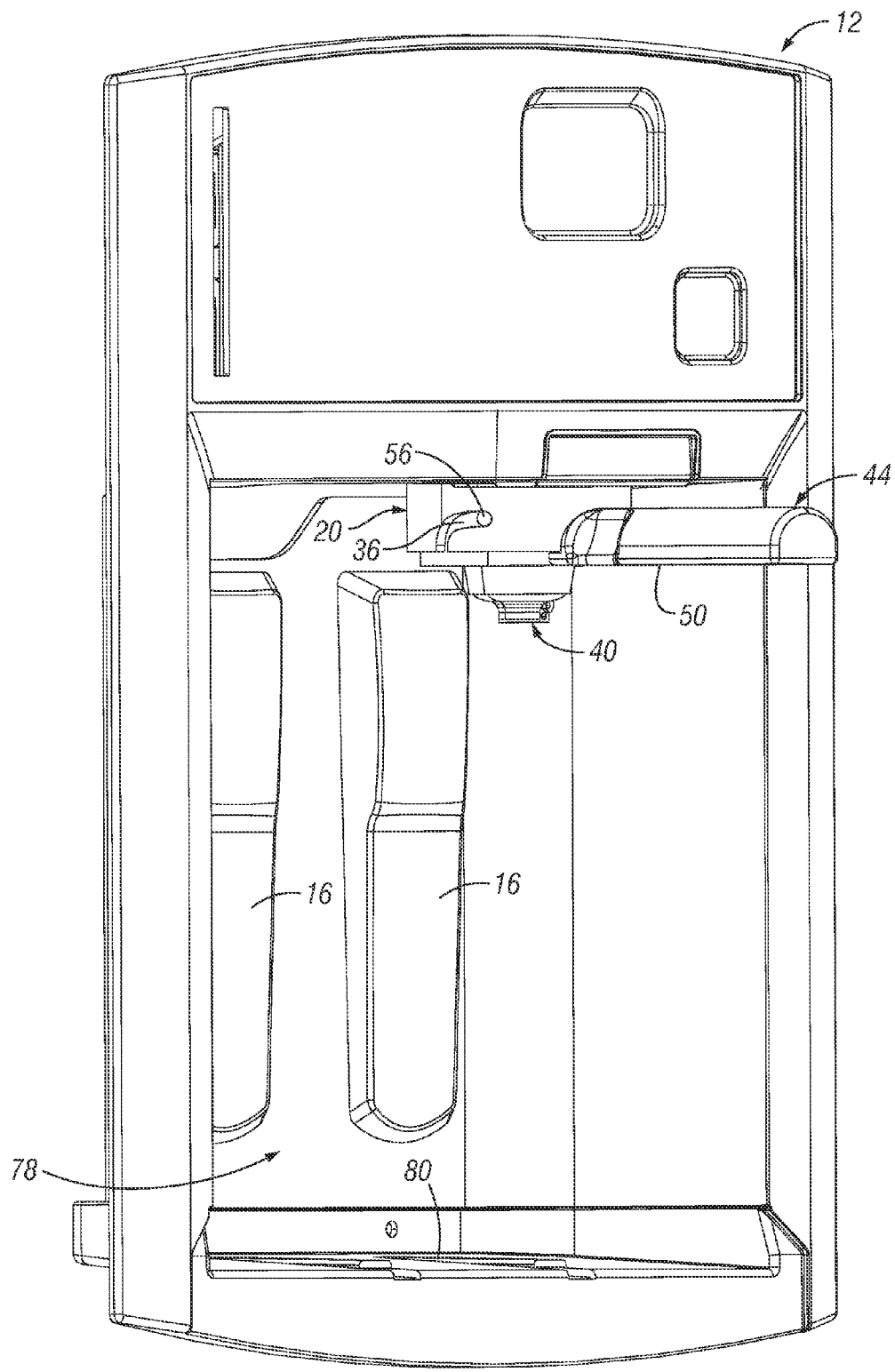
FIG. 12B is a perspective view of the indoor water dispenser of the prior art shown in FIG. 10 with an assembled illustration of the retrofit adapter shown in FIG. 11A with the capsule and capsule holder shown in FIG. 4.

FIG. 11B illustrates an exploded view of indoor water dispenser 12 of the prior art shown in FIG. 9. The indoor water dispenser 12 of the prior art has an existing water outlet 14. Water outlet 14 is shown connected to indoor water dispenser 12 by an existing clip 60. The existing water outlet 14 has connection points 22, such as flanges 62 protruding perpendicularly outward from the main body of the outlet 14. Adapter 20 has connection geometry 22, such as hooked prongs 38 which are configured to secure to the existing flanges 62 on water outlet 14 of indoor water dispenser 12 as best illustrated in FIG. 11C. Water outlet interface 24 in aperture 26 of adapter 20 seals about the existing water outlet 14 of indoor water dispenser 12. FIG. 11C shows water outlet 14 of indoor water dispenser 12 of the prior art connected and sealed to adapter 20 according to one aspect of the present invention. FIG. 11D illustrates adapter 20 connected to the existing water outlet 14 of indoor water dispenser 12. Adapter 20 is secured to the existing water outlet 14 associated with indoor water dispenser 12 without having to disassemble indoor water dispenser 12 so that adapter 20 can be simply secured into place as shown in FIG. 12A. If secured to indoor water dispenser 12, water outlet interface 24 on adapter 20 seals to water outlet 14 so as to maintain pressure of the water within water outlet 14 within the retrofit and prevent water from leaking at the interface between water outlet interface 24 and water outlet 14. Water outlet interface 24 may also be used to help secure adapter 20 to the indoor water dispenser 12 alone or with the additional support of connection geometries 22 attached to preexisting connection points 18 associated with the indoor water dispenser 12. An additive capsule 40 may be secured to the universal attachment interface 34 associated with adapter 20 or with capsule holder 44 as shown in FIGS. 12A-B. Seal 48 may be used to seal connection interface 42 of additive capsule 40 to universal attachment interface 34 of adapter 20. Additive capsule 40 may be preconfigured with an attachment mechanism for securing to adapter 20 or using capsule holder 44.

Figure 13A:
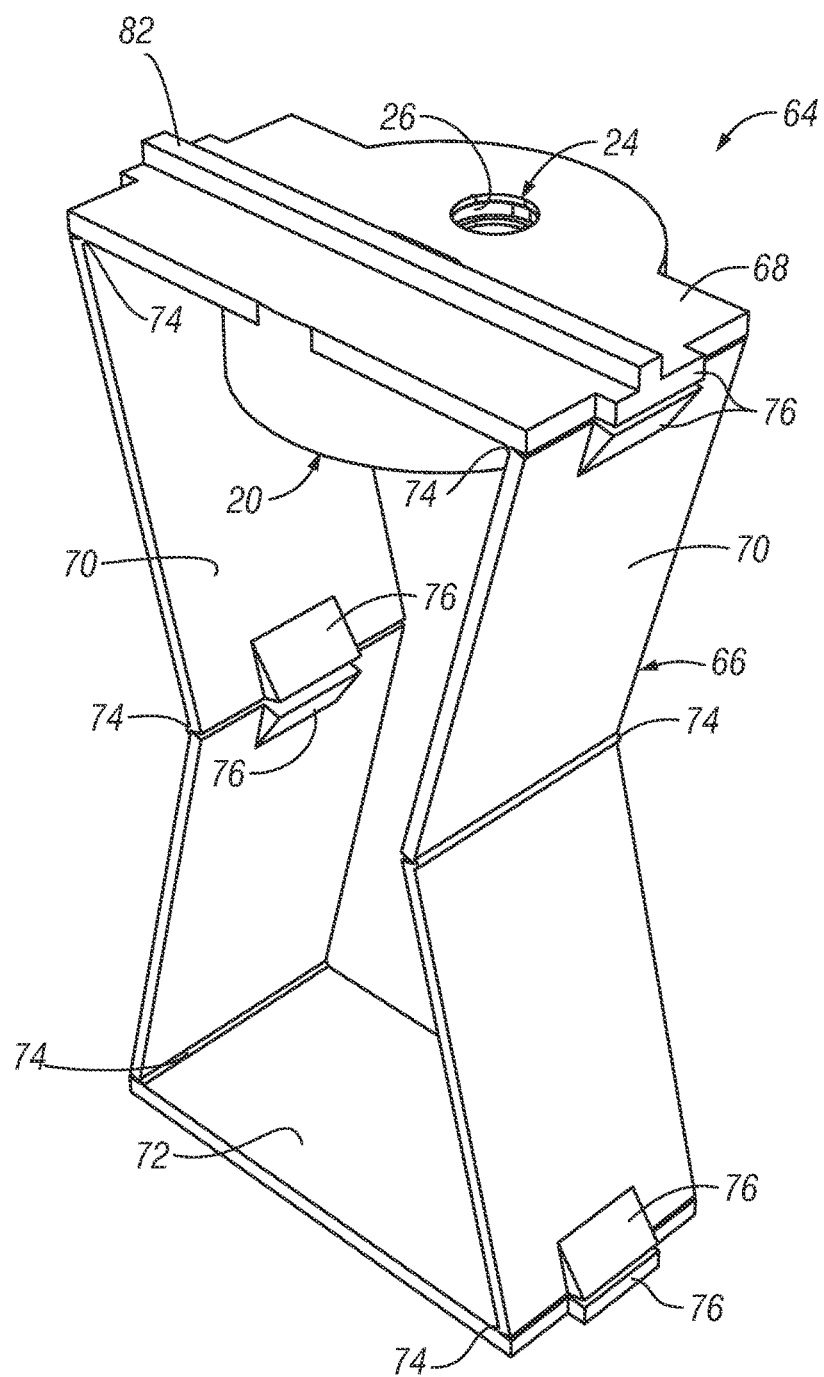
FIG. 13A is a perspective view of a pressure coupling assembly with an adapter according to an exemplary embodiment of the present invention.

FIG. 13A discloses an alternative retrofit or pressure coupling assembly 64 for securing adapter 20 to an indoor water dispenser, such as indoor water dispenser 12 shown in FIG. 2. Pressure coupling assembly 64 is adapted to pressure fit adapter 20 into an engaging relationship around the area of water outlet 14 in dispensing area 78 as best illustrated in FIG. 14B. Adapter 20 is similar in structure and features as presented and discussed above. Adapter 20 may include an aperture 26 at water outlet interface 24 and groove 36 for attaching other components such as additive capsule 40 and capsule holder 44 shown in FIG. 4 to adapter 20. It should be appreciated that adapter 20 and pressure coupling assembly 64 may be single or separate components. For example, adapter 20 could be configured to attach to top 68 of body 66 of pressure coupling assembly 64.

Figure 13B:
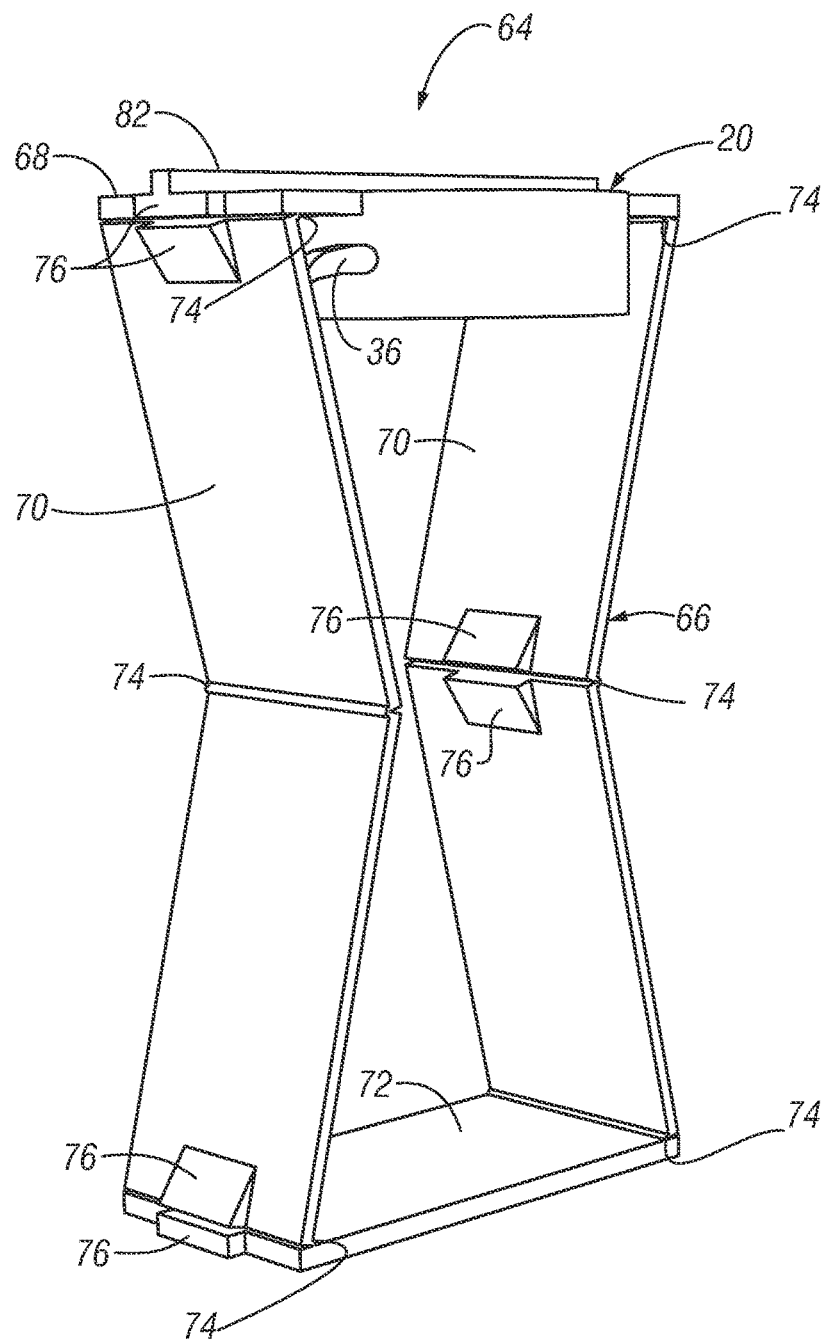
FIG. 13B is another perspective view of the pressure coupling assembly and adapter shown in FIG. 13A.

As best illustrated in FIG. 13A-13B, pressure coupling assembly 64 comprises a body 66 having a top 68 and bottom 72 adjoined by a pair of legs 70. Legs 70 are connected to top 68 and bottom 72 by way of living hinges 74. Living hinge 74 allows legs 70 to collapse in a direction back upon themselves as illustrated in FIGS. 13A-13B. Legs 70, top 68 and bottom 72 include abutments 76 which aid legs 70 in absorbing the compression forces exerted on pressure coupling assembly 64 when fully erect and in a state of compression within the dispensing area 78 of the indoor water dispenser 12, as best illustrated in FIGS. 14A-14B.

The general purpose of pressure coupling assembly 64 is to secure a retrofit piece, such as adapter 20, within the dispensing area 78 of indoor water dispenser 12. The pressure coupling assembly 64 is secured using the concept of pressure fitting by expansion or telescopic extension, such that pressure coupling assembly 64 is pressure fit within dispensing area 78 or relative to dispensing area 78 using the existing surfaces of dispensing area 78, such as tray 80. Given this understanding, those skilled in the art can appreciate that pressure coupling assembly 64 can take on many different configurations. For example, any erectable, telescopically extensible or expandable supporting structure could be used to pressure fit adapter 20 relative to the water outlet 14 in indoor water dispenser 12. The possible alternatives for pressure fitting adapter 20 relative to water outlet 14 should not be construed as being limited to pressure coupling assembly 64. For example, alternative embodiments of pressure coupling assembly 64 could be used to pressure fit or support adapter 20 relative to water outlet 14; these assemblies could include a structure that is expandable or telescopically extensible in nature, as previously discussed, and that can adjust to various dimensions associated with various brands, makes, platforms and models of indoor water dispensers or water dispensers. In the case where indoor water dispenser 12 is devoid of pre-existing connection points 18, such as cracks, seams, existing clip-end points, pressure coupling assembly 64 allows adapter 20 to be secured within dispensing area 78 relative to water outlet 14 regardless if indoor water dispenser 12 has pre-existing connection points 18 for attaching adapter 20, as discussed above. Those skilled in the art should appreciate that pressure coupling assembly 64 is not limited to instances where pre-existing connection points 18 are not available in indoor water dispenser 12 but could be used in fact in instances where indoor water dispenser 12 has pre-existing connection points 18 but is better suited for use of a supporting structure like pressure coupling assembly 64 for supporting adapter 20 relative to water outlet 14.

Figure 14A:
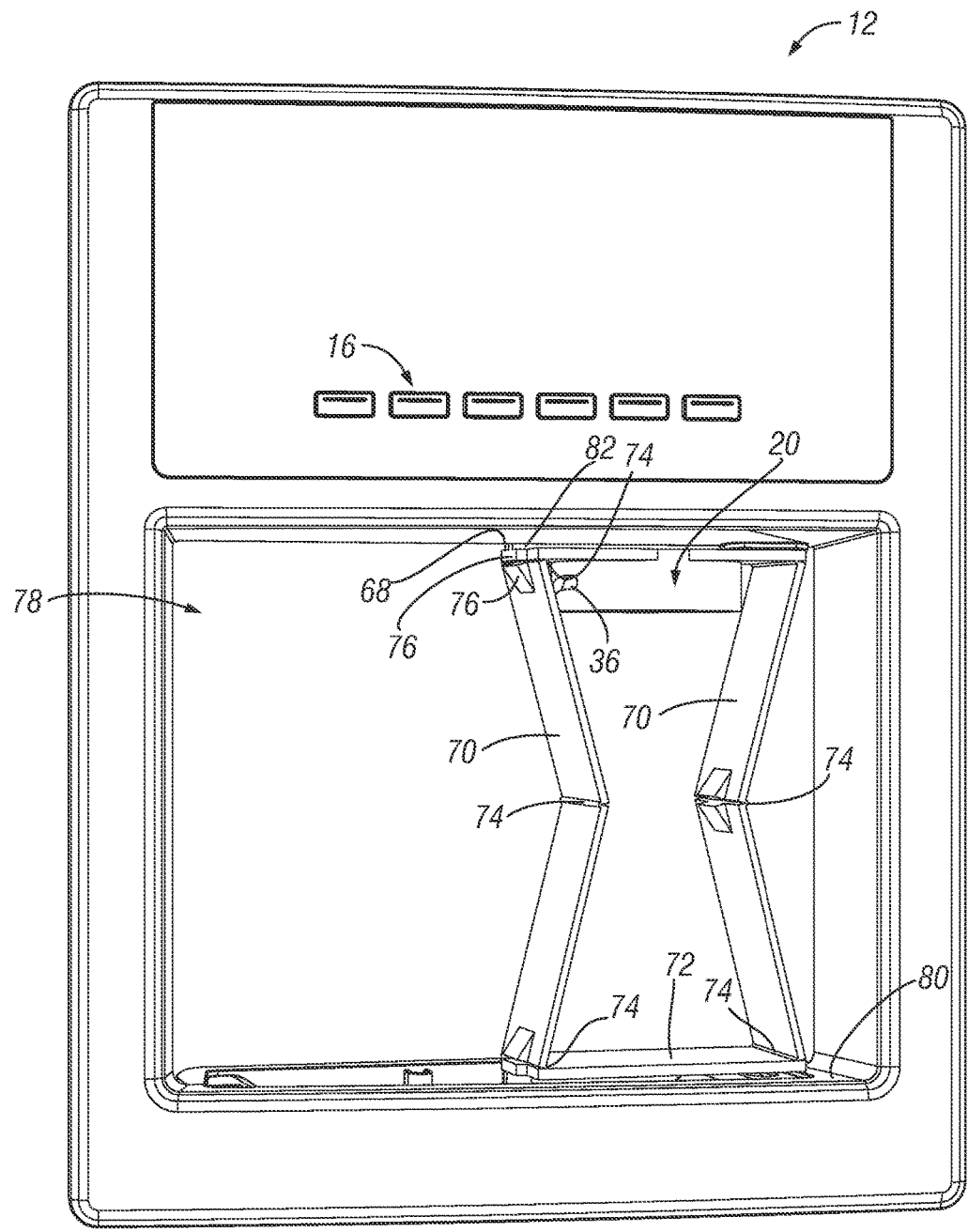
FIG. 14A is a perspective view of the indoor water dispenser of the prior art shown in FIG. 2 with the pressure coupling assembly and adapter shown in FIG. 13A assembled according to an exemplary aspect of the present invention.
Figure 14B:
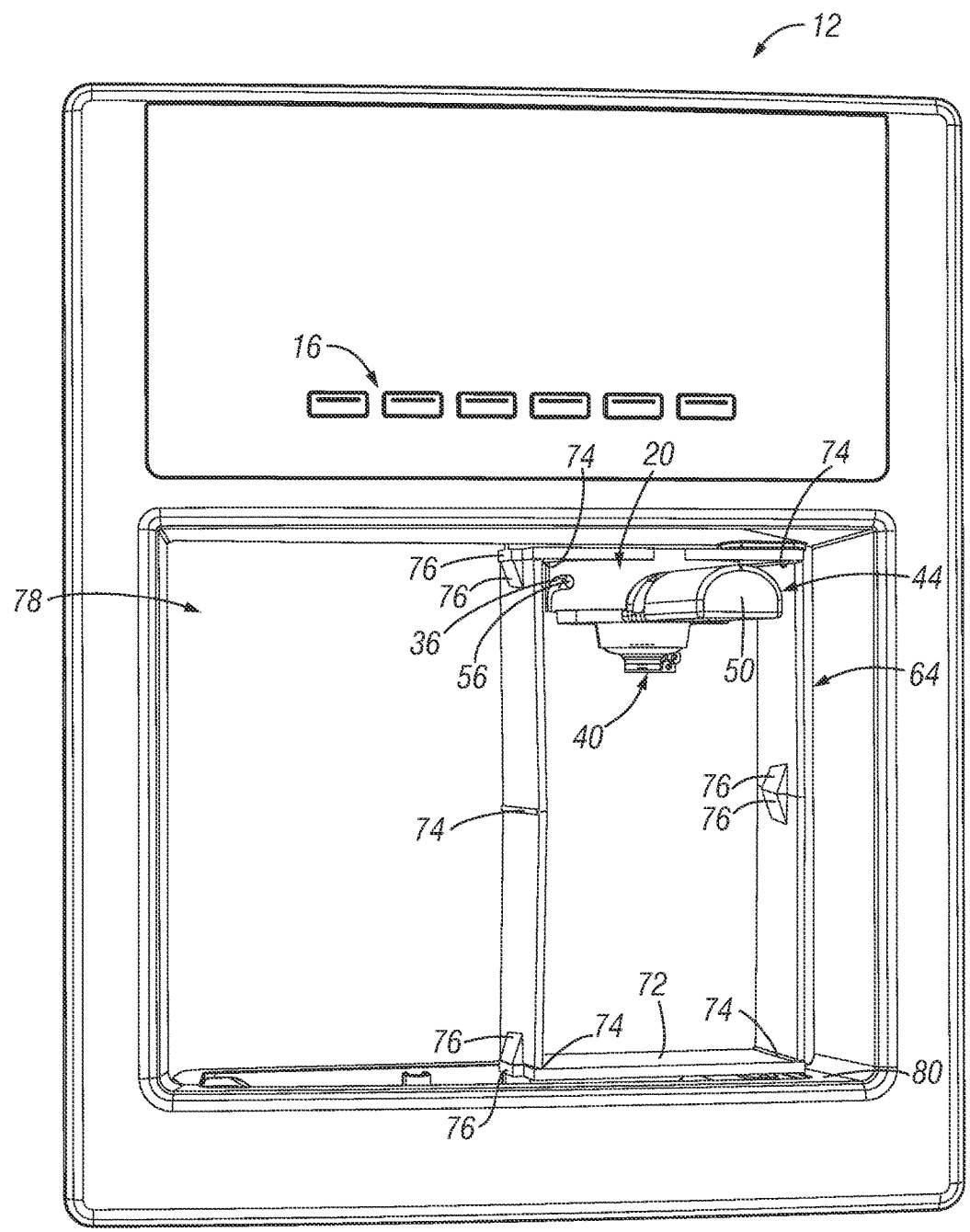
FIG. 14B is another perspective view of the indoor water dispenser of the prior art shown in FIG. 2 with the pressure coupling assembly and adapter shown in FIG. 13A along with the additive capsule and capsule holder shown in FIG. 4.

As illustrated in FIG. 14A, pressure coupling assembly 64 is sufficiently collapsible to be inserted into dispensing area 78 so that bottom 72 of pressure coupling assembly 64 rests on tray 80 of indoor dispenser 12. Pressure coupling assembly 64 can be aligned within dispensing area 78 so that aperture 26 is concentric with water outlet 14. Moving leg 70 from a bent position to an erect position causes top 68 and bottom 72 of pressure coupling assembly 64 to be pressure fit between tray 80 and an existing surface near water outlet 14; moving legs 70 from a bent position to an erect position forces water outlet 14 through aperture 26 of water outlet interface 24. As previously discussed, water outlet interface 24 or aperture 26 may include a number of sealing components, such as a seal, O-ring, grommet, or like sealing component to seal about water outlet 14, so as to maintain pressure of water exiting water outlet 14 into adapter 20 and to prevent leaking.

Those skilled in this art would appreciate that the retrofit of the present invention should not be construed as being limited only to refrigerators. For example, the apparatuses of the present invention could be retrofitted to a number of water dispensers, including chilled water dispensing devices for enhanced beverage dispensing. Water dispensers could include, but should not be construed as being limited to faucets, countertop/tabletop water dispensers, water dispensing cabinets, water bubblers, or any like water dispensers. Chilled water dispensers could include, but should not be construed as being limited to countertop/tabletop water coolers, water cooler cabinets, water dispenser coolers, faucets, chilled water bubblers or any like chilled water dispenser.

Method

A method for retrofitting indoor water dispenser 12 of refrigerator 10 having a water outlet 14 is also disclosed. The method includes attaching adapter 20 to preexisting connection points 18 associated with the indoor water dispenser 12 and sealing the water outlet interface 24 of adapter 20 about water outlet 14. Adapter 20 may be configured with one or more connection geometries 22 such as those illustrated in FIGS. 3B, 6A, 11A, 13A, and 13B. Connection geometries 22 could be a part that's tailored to fit the various specifications for several indoor water dispenser brands. For example, adapter 20 may have one type of connection geometry 22 configured for one brand of water dispenser and another type of connection geometry 22 for another indoor water dispenser brand. The connection geometries 22 associated with adapter 20 may be used to attach adapter 20 to one or more preexisting connection points 18 associated with indoor water dispenser 12 by clipping into one or more preexisting connection points 18, hooking onto one or more of the preexisting connection points 18, clamping onto one or more of the preexisting connection points 18, snapping onto or into one or more of preexisting connection points 18, or adhering to one or more of the preexisting connection points 18. One skilled in the art can appreciate that connection geometries 22 associated with adapter 20 could take on countless number of configurations depending on the make, model, platform, and type of indoor water dispenser 12. Thus, in the broadest sense, connection geometries 22 could be any geometry, whether universal or model specific, that could secure adapter 20 with universal attachment interface 34 (shown in FIG. 3A1) to any preexisting connection points 18 associated with the refrigerator 10, indoor water dispenser 12 and/or water outlet 14. In addition to securing adapter 12 to indoor water dispenser 12, water outlet interface 24 may be sealed about water outlet 14, by positioning adapter 20 relative to water outlet 14 so that water outlet 14 is inserted into water outlet interface 24. The water outlet interface 24 and water outlet 14 are mated so as to seal adapter 20 to water outlet 14 to maintain the pressure of the water from water outlet 14 within adapter 20 and to prevent water from leaking from the retrofit unit. Once adapter 20 is attached and secured to the indoor water dispenser 12, additive capsule 40 may be secured to adapter 20. Additive capsule 40 may be secured to adapter 20 and the interface between the two sealed to prevent leaking and loss of pressure by threading additive capsule 40 onto universal attachment interface 34, snapping additive capsule 40 onto universal attachment interface 34, coupling additive capsule 40 to universal attachment interface 34, hooking additive capsule 40 onto universal attachment interface 34, clamping additive capsule 40 onto universal attachment interface 34, clipping additive capsule 40 onto universal attachment interface 34 or pressure fitting additive capsule 40 onto universal attachment interface 34. Similarly, additive capsule 40 may be attached, secured and sealed to adapter 20 using capsule holder 44. By activating the indoor water dispenser 12, water is dispensed from water outlet 14, through water outlet interface 24 into adapter 20, and through and/or to additive capsule 40 to combine with an additive within additive capsule 40 or dispense an additive to create an enhanced beverage. It should be appreciated that adapter 20 or additive capsule 40 may be designed to channel all or a portion of water from water outlet 14 around, to, or through additive capsule 40 to combine with an additive to create an enhanced beverage. In the event that additive capsule 40 is a consumable part or disposable, additive capsule 40 may be used to create an enhanced beverage, discarded and replaced with a new additive capsule 40. Alternatively, additive capsule 40 may be configured so that the additive may be replenished or recharged for creating subsequent enhanced beverages as opposed to discarding additive capsule 40 as a consumable or disposable part.

FIGS. 14A-14B disclose an alternative method for securing adapter 20 about water outlet 14 within dispensing area 78 of indoor water dispenser 12. To this point, what has been disclosed are embodiments of a retrofit that use existing connection points in indoor water dispenser 12 to attach adapter 20 to indoor water dispenser 12 and seal about water outlet 14 of the indoor water dispenser 12. Those familiar with this art area can appreciate that some indoor water dispensers may not provide the necessary pre-existing connection points to secure a retrofit piece thereto. The pressure coupling assembly 64 shown in FIGS. 14A-14B addresses these situations by providing a solution, but should not be construed as being limited for use to instances where the indoor water dispenser is devoid of pre-existing connection points.

As discussed earlier in the apparatus section, adapter 20 and pressure coupling assembly 64 could be a single piece or two-piece component or even a multi-piece component. In the case where adapter 20 and pressure coupling assembly 64 are separate components, adapter 20 could be secured to pressure coupling assembly 64 by threads, a quick-coupling joint, pressure fitting joint, or any like attaching interface of sufficient retention strength, so as to secure adapter 20 to pressure coupling assembly 64. Pressure coupling assembly 64 may be prepared to insert within dispensing area 78 of indoor water dispenser 12 by collapsing legs 70 so that living hinges 74 move toward each other as do top 68 and bottom 72. Those skilled in the art can appreciate that collapsing pressure coupling assembly 64 could be accomplished by alternative means. For example, legs 70 could be telescopically extensible, such that body 66 of pressure coupling assembly 64 could be altered in height as needed. Having positioned pressure coupling assembly 64 within dispensing area 78 and aligned water outlet interface 24 including aperture 26 concentric with water outlet 14, pressure coupling assembly 64 may be moved from the collapsed position to the fully-erect position as best shown in FIG. 14B. Pressure applied by legs 70 to top 68 and bottom 72 of pressure coupling assembly 64 wedges or by a forced fit secures pressure coupling assembly 64 within dispensing area 78 as well as secures top 68 about water outlet interface 24 and water outlet 14. Water outlet interface 24 may further include structure such as ridge 82 to prevent pressure coupling assembly 64 from moving when secured within dispensing area 78 of indoor water dispenser 12, as shown in FIG. 14B.

It should further be appreciated that water outlet interface 24 could be configured with any number of seals to help seal top 68 about water outlet 14. Additionally, aperture 26 could also include any number of seals to seal aperture 26 about water outlet 14. These seals would help prevent leaking, as well as retain the pressure of the water being dispensed from water outlet 14 into adapter 20. When legs 70 are moved from the collapsed position to the fully-erect position, abutments 76 on top 68, bottom 72 and legs 70 help to absorb the compression forces experienced by pressure coupling assembly 64 and further to prevent legs 70 from buckling. With pressure coupling assembly 64 secured within dispensing area 78 of indoor water dispenser 12, additive capsule 40 may be secured to adapter 20 alone or in combination with capsule holder 44 by moving pins 56 into grooves 36 of adapter 20. With adapter 20 pressure fit about water outlet 14, water from water outlet 14 can be dispensed through additive capsule 14 for providing an enhanced beverage at dispensing area 78 of indoor water dispenser 12.

Those skilled in the art can appreciate that pressure coupling assembly 64 could be left in place and additive capsule 40 replaced with a new additive capsule as a consumable, disposable or reusable component. Alternatively, pressure coupling assembly 64 could be collapsed and removed when not in use. Furthermore, pressure coupling assembly 64 could be manufactured to match the esthetics of the various make, model, platform and brand of indoor water dispensers and refrigerators.

Those skilled in this art would appreciate that the retrofit of the present invention should not be construed as being limited only to refrigerators. For example, the methods of the present invention could be used to retrofit any number of water dispensers, including chilled water dispensing devices for enhanced beverage dispensing. Water dispensers could include, but should not be construed as being limited to faucets, countertop/tabletop water dispensers, water dispensing cabinets, water bubblers, or any like water dispensers. Chilled water dispensers could include, but should not be construed as being limited to countertop/tabletop water coolers, water cooler cabinets, water dispenser coolers, faucets, chilled water bubblers or any like chilled water dispenser.

Kit

The present invention provides for a kit for retrofitting an existing water dispenser 12 of a refrigerator 10 for beverage dispensing. The kit may include an adapter 20, as previously set forth and described, to secure to the indoor water dispenser 12 and seal to water outlet 14 of indoor water dispenser 12 for dispensing water there-through. The kit may also include a set of instructions on how to install adapter 20 to indoor water dispenser 12. The kit may include one or may tools used to install adapter 20 to indoor water dispenser 12 depending on the make, model, platform, or brand of dispenser as well as adapter 20. The kit could be configured such that connection geometry 22 associated with adapter 20 are specific to each make and model of refrigerator 10 and their respective water dispensers 12. Thus, the user could order or purchase a kit for retrofitting indoor water dispenser 12 of their refrigerator 10 where the specific connection geometries 22 associated with adapter 20 would be configured to fit the specific model of refrigerator 10. Adapter 20 could be configured as a universal component of the kit so various components, such as additive capsule 40, could be connected to adapter 20 to create an enhanced beverage. The kit could also include a number of additive capsules 40 having various flavor or additive types. These additive capsules 40, as previously explained, could be a consumable or disposable part of the kit and replaceable by purchasing anew; alternatively, the additive component could be rechargeable or replenishable such as when grounds or powder are used as the additive. In another aspect of the present invention, the additive component may be a flavoring component, a soluble component, a non-soluble component, a powder, a liquid, a brew, any combination of the aforementioned components, or any combination of the aforementioned components where one additive component interacts or reacts with another or with the water stream. Depending on the preferred configuration of each additive capsule, additive capsule 40 could have a connection interface 42 for securing to universal attachment interface 34 associated with adapter 20. Additionally, other connection hardware/components, such as capsule holder 44, could be included in the kit and used to secure additive capsule 40 to adapter 20. Capsule holder 44 could be included as part of the kit depending on the style of additive capsule 40 and whether or not additive capsule 40 alone would connect to adapter 20 or be connected to adapter 20 using capsule holder 44.

An apparatus, method and kit for retrofitting an indoor water dispenser of an existing refrigerator having a water outlet and existing points that could be used to connect one or more other components thereto for creating enhanced beverages is disclosed. Those skilled in this art would appreciate that the retrofit of the present invention should not be construed as being limited only to refrigerators. For example, the kit of the present invention could be retrofitted to a number of water dispensers, including chilled water dispensing devices for enhanced beverage dispensing. Water dispensers could include, but should not be construed as being limited to faucets, countertop/tabletop water dispensers, water dispensing cabinets, water bubblers, or any like water dispensers. Chilled water dispensers could include, but should not be construed as being limited to countertop/tabletop water coolers, water cooler cabinets, water dispenser coolers, faucets, chilled water bubblers or any like chilled water dispenser.

The present invention contemplates numerous variations, options, and alternatives and is not to be limited to the specific embodiments described here.

What is claimed is:

1. An apparatus for filtering liquid dispensed from a refrigerator liquid dispenser having a liquid flow path with a liquid outlet in fluid communication with a dispensing area, comprising:
    a liquid filtering component enclosed within a filter housing having an attachment end with a liquid inlet adapted for fluid communication with the liquid outlet of the refrigerator liquid dispenser, and an opposite dispensing end with an outlet adapted for fluid communication with the dispensing area, wherein the liquid filtering component is housed between the attachment and dispensing ends of the filter housing;
    an adapter portion separate from the liquid inlet at the attachment end, the adapter portion comprising:
    a. at least one connector for removably securing a body of the filter housing to the refrigerator liquid dispenser with the liquid inlet in fluid communication with the liquid outlet of the dispenser;
    b. an aperture on the adapter portion, wherein the liquid outlet of the refrigerator liquid dispenser extends through the aperture; and
    wherein the liquid filtering component removes unwanted components from liquids dispensed from the refrigerator liquid dispenser.

2. The apparatus of claim 1 wherein the connector is configured to retrofittably secure the filter housing to one or more stock component features of the refrigerator liquid dispenser.

3. The apparatus of claim 1 wherein the filter housing liquid inlet has a seal configured to mate with the liquid outlet of the refrigerator liquid dispenser.

4. The apparatus of claim 1 further comprising a capsule holder removably attached to the adapter portion to hold the filter housing in place at the liquid outlet of the refrigerator liquid dispenser.

* * * * *